United States Patent
Tsai et al.

(10) Patent No.: US 11,638,307 B2
(45) Date of Patent: Apr. 25, 2023

(54) WIRELESS COMMUNICATION METHOD AND USER EQUIPMENT FOR RANDOM ACCESS OPERATIONS

(71) Applicant: FG Innovation Company Limited, Tuen Mun (HK)

(72) Inventors: Hsin-Hsi Tsai, Taipei (TW); Heng-Li Chin, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 32 days.

(21) Appl. No.: 17/151,617

(22) Filed: Jan. 18, 2021

(65) Prior Publication Data

US 2021/0227587 A1 Jul. 22, 2021

Related U.S. Application Data

(60) Provisional application No. 62/963,495, filed on Jan. 20, 2020.

(51) Int. Cl.

| | |
|---|---|
| *H04W 74/08* | (2009.01) |
| *H04W 76/27* | (2018.01) |
| *H04W 74/00* | (2009.01) |
| *H04W 56/00* | (2009.01) |
| *H04W 72/21* | (2023.01) |

(52) U.S. Cl.
CPC ... *H04W 74/0833* (2013.01); *H04W 56/0045* (2013.01); *H04W 72/21* (2023.01); *H04W 74/006* (2013.01); *H04W 76/27* (2018.02)

(58) Field of Classification Search
CPC .......... H04W 74/0833; H04W 74/006; H04W 76/27; H04W 56/0045; H04W 72/0413

USPC .......................................................... 370/329
See application file for complete search history.

(56) References Cited

U.S. PATENT DOCUMENTS

| | | | |
|---|---|---|---|
| 2019/0356376 A1* | 11/2019 | You ..................... | H04W 72/046 |
| 2020/0260496 A1* | 8/2020 | Jin ..................... | H04W 74/0833 |
| 2021/0185724 A1* | 6/2021 | Agiwal ................ | H04W 76/27 |

(Continued)

OTHER PUBLICATIONS

3GPP TS 38.213, "3rd Generation Partnership Project; Technical Specification Group Radio Access Network; NR; Physical layer procedures for control (Release 15)", V15.4.0 (Dec. 2018).

(Continued)

*Primary Examiner* — Chi Tang P Cheng
(74) *Attorney, Agent, or Firm* — ScienBiziP, P.C.

(57) ABSTRACT

A wireless communication method and a User Equipment (UE) for Random Access (RA) operations are provided. The wireless communication method includes receiving, from a Base Station (BS), a Radio Resource Control (RRC) reconfiguration message including information related to a reconfiguration with synchronization, the information including a Contention Free Random Access (CFRA) configuration for 2-step Random Access (RA), the CFRA configuration configuring a resource and a maximum number of Message-A (MSGA) preamble transmissions; initiating an RA procedure, with an RA type set to a 2-step RA type, for the reconfiguration with synchronization; and discarding the resource in a case that a value of a preamble transmission counter reaches to the maximum number of MSGA preamble transmissions.

16 Claims, 17 Drawing Sheets

(56) References Cited

U.S. PATENT DOCUMENTS

2021/0185733 A1* 6/2021 Agiwal ............. H04W 72/0453

OTHER PUBLICATIONS

3GPP TS 38.321, "3rd Generation Partnership Project; Technical Specification Group Radio Access Network; NR; Medium Access Control (MAC) protocol specification (Release 15)", V15.7.0 (Sep. 2019).

3GPP TS 38.331, "3rd Generation Partnership Project; Technical Specification Group Radio Access Network; NR; Radio Resource Control (RRC) protocol specification (Release 15)", V15.7.0 (Sep. 2019).

3GPP TS 38.300, "3rd Generation Partnership Project; Technical Specification Group Radio Access Network; NR; NR and NG-RAN Overall Description; Stage 2 (Release 15)", V15.7.0 (Sep. 2019).

3GPP TS 38.101-1, "3rd Generation Partnership Project; Technical Specification Group Radio Access Network; NR; User Equipment (UE) radio transmission and reception; Part 1: Range 1 Standalone (Release 15)", V15.0.0 (Dec. 2017).

3GPP TS 38.101-2, "3rd Generation Partnership Project; Technical Specification Group Radio Access Network; NR; User Equipment (UE) radio transmission and reception; Part 2: Range 2 Standalone (Release 15)", V15.0.0 (Dec. 2017).

3GPP TS 38.101-3, "3rd Generation Partnership Project; Technical Specification Group Radio Access Network; NR; User Equipment (UE) radio transmission and reception; Part 3: Range 1 and Range 2 Interworking operation with other radios (Release 15)", V15.0.0 (Dec. 2017).

3GPP TS 38.214, "3rd Generation Partnership Project; Technical Specification Group Radio Access Network; NR; Physical layer procedures for data (Release 15)", V15.1.0 (Mar. 2018).

3GPP TS 38.211, "3rd Generation Partnership Project; Technical Specification Group Radio Access Network; NR; Physical channels and modulation (Release 15)", V15.5.0 (Mar. 2019).

* cited by examiner

WIRELESS COMMUNICATION METHOD AND USER EQUIPMENT FOR RANDOM ACCESS OPERATIONS

CROSS-REFERENCE TO RELATED APPLICATION(S)

The present disclosure claims the benefit of and priority to provisional U.S. Patent Application Ser. No. 62/963,495 ("the '495 provisional"), filed on Jan. 20, 2020, entitled "Method and Apparatus for Release of 2-step Random Access Resources." The content(s) of the '495 provisional are fully incorporated herein by reference for all purposes.

FIELD

The present disclosure is generally related to wireless communications, and specifically, to a wireless communication method and a User Equipment (UE) for Random Access (RA) operations.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to wireless communication method(s) and UE(s) for RA operations.

According to an aspect of the present disclosure, a wireless communication method performed by a UE is provided. The wireless communication method includes receiving, from a Base Station (BS), a Radio Resource Control (RRC) reconfiguration message including information related to a reconfiguration with synchronization, the information including a Contention Free Random Access (CFRA) configuration for 2-step Random Access (RA), the CFRA configuration configuring a resource and a maximum number of Message-A (MSGA) preamble transmissions; initiating an RA procedure, with an RA type set to a 2-step RA type, for the reconfiguration with synchronization; and discarding the resource in a case that a value of a preamble transmission counter reaches to the maximum number of MSGA preamble transmissions.

According to another aspect of the present disclosure, a UE is provided. The UE includes a processor and a memory coupled to the processor. The memory stores at least one computer-executable program that, when executed by the processor, causes the processor to receive, from a BS, an RRC reconfiguration message including information related to a reconfiguration with synchronization, the information including a Contention Free Random Access (CFRA) configuration for 2-step Random Access (RA), the CFRA configuration configuring a resource and a maximum number of Message-A (MSGA) preamble transmissions; initiate an RA procedure, with an RA type set to a 2-step RA type, for the reconfiguration with synchronization; and discard the resource in a case that a value of a preamble transmission counter reaches to the maximum number of MSGA preamble transmissions.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
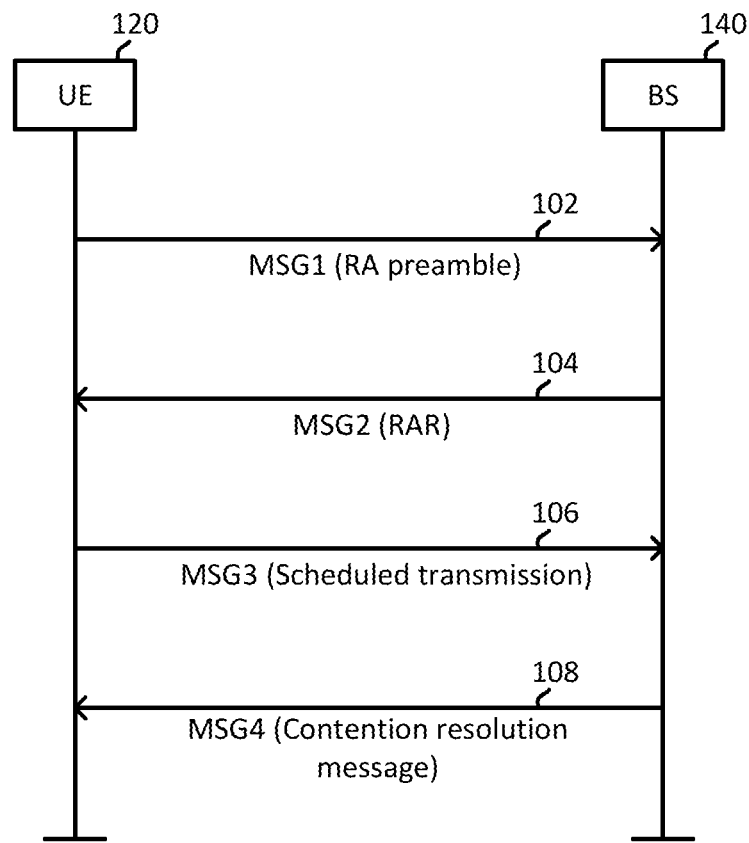
FIG. 1 illustrates an example of a Contention-Based Random Access (CBRA) with 4-step RA type in accordance with an implementation of the present disclosure.

The acronyms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th generation |
| 5GC | 5G Core |
| AM | Acknowledge Mode |
| AS | Access Stratum |
| BA | Bandwidth Aggregation |
| BFR | Beam Failure Recovery |
| BS | Base Station |
| BSR | Buffer Status Reporting |
| BWP | Band Width Part |
| CA | Carrier Aggregation |
| CBRA | Contention-Based Random Access |
| CC | Component Carriers |
| CCCH | Common Control Channel |
| CE | Control Element |
| CFRA | Contention-Free Random Access |
| CG | Cell Group |
| C-RNTI | Cell-Radio Network Temporary Identifier |
| CSI | Channel State Information |
| CSI-RS | Channel State Information based Reference Signal |
| CQI | Channel Quality Indicator |
| DCI | Downlink Control Information |
| DL | Downlink |
| DRB | Data Radio Bearer |
| gNB | Next-Generation Node B |
| HO | Handover |
| IE | Information Element |
| L1 | Layer 1 |
| L2 | Layer 2 |
| LTE | Long Term Evolution |
| MAC | Medium Access Control |
| MCG | Master Cell Group |
| MIMO | Multi-input Multi-output |
| MSG0 | Message-0 |
| MSG1 | Message-1 |
| MSG2 | Message-2 |
| MSG3 | Message-3 |
| MSG4 | Message-4 |
| MSGA | Message-A |
| MSGB | Message-B |
| NG-C | Next-Generation Core |
| NR | New RAT |
| NUL | Normal Uplink |
| PCell | Primary Cell |
| PDCCH | Physical Downlink Control Channel |
| PDCP | Packet Data Convergence Protocol |
| PDU | Protocol Data Unit |
| PHY | Physical Layer |
| PRACH | Physical Random Access Channel |
| PSCell | Primary SCell |
| PUCCH | Physical Uplink Control Channel |
| PUSCH | Physical Uplink Shared Channel |
| QoS | Quality of Service |
| RA | Random Access |
| RAT | Radio Access Technology |
| RACH | Random Access Channel |
| RAR | Random Access Response |
| Rel-15 | Release 15 |
| Rel-16 | Release 16 |
| RLC | Radio Link Control |
| RLF | Radio Link Failure |
| RNTI | Radio Network Temporary Identifier |
| RRC | Radio Resource Control |
| RRM | Radio Resource Management |
| RS | Reference Signal |
| RSRP | Reference Signal Received Power |
| RTT | Round Trip Time |

-continued

| Abbreviation | Full name |
| --- | --- |
| SCell | Secondary Cell |
| SCG | Secondary Cell Group |
| SDU | Service Data Unit |
| SI | System Information |
| SIB | System Information Block |
| SR | Scheduling Request |
| SRB | Signaling Radio Bearer |
| SRS | Sounding Reference Signal |
| SSB | Synchronization Signal Block |
| SpCell | Special Cell |
| SUL | Supplementary Uplink |
| TA | Timing Advance |
| TAG | Timing Advance Group |
| TNL | Transport Network Layer |
| TR | Technical Report |
| TRP | Transmission/Reception Point |
| TS | Technical Specification |
| UE | User Equipment |
| UL | Uplink |
| UL-SCH | Uplink Shared Channel |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" includes the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

A UE according to the present disclosure may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in an RAN.

A BS according to the present disclosure may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned previously.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC)

code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

In NR, two types of RA procedure are supported:

RA procedure with 4-step RA type (e.g., 4-step CFRA or 4-step CBRA), in which the messages transmitted between the transmit device and the receive device may be identified as:

MSG1: preamble transmission (from UE to NW) of the RA procedure for RA procedure with 4-step type;

MSG2: RAR (from NW to UE) of the RA procedure with 4-step RA type. An RAR may be a response to MSG1 in the RA procedure with 4-step RA type;

MSG3: Message transmitted (from UE to NW) on UL-SCH containing a C-RNTI MAC CE or CCCH SDU, submitted from upper layer and associated with the UE Contention Resolution Identity, as part of RA procedure with 4-step RA type; and MSG4: A PDCCH transmission (from NW to UE) for the contention resolution in the RA procedure with 4-step RA type. If the UE considers the contention resolution of the RA procedure is successful, the UE may consider the RA procedure successfully completed, where 4-step CFRA may refer to CFRA with 4-step RA type and 4-step CBRA may refer to CBRA with 4-step RA type.

An RA procedure with 2-step RA type (e.g., 2-step CFRA or 2-step CBRA), in which the messages transmitted between the transmit device and the receive device may be identified as:

MSGA: preamble and payload transmissions (from UE to NW) of the RA procedure with 2-step RA type; and MSGB: response to MSGA (from NW to UE) in the RA procedure with 2-step RA type. MSGB may consist of response(s) for contention resolution, fallback indication(s), and/or back-off indication, where 2-step CFRA may refer to CFRA with 2-step RA type and 2-step CBRA may refer to CBRA with 2-step RA type.

The UE selects the type of RA at initiation of the RA procedure based on network configuration.

For example, when CFRA resources are not configured, an RSRP threshold may be used by the UE to select between 2-step RA type and 4-step RA type.

For example, when CFRA resources for 4-step RA type are configured, the UE performs random access with 4-step RA type.

For example, when CFRA resources for 2-step RA type are configured, the UE performs random access with 2-step RA type.

The network does not configure CFRA resources for 4-step and 2-step RA types at the same time for a BWP. CFRA with 2-step RA type may be only supported for handover.

Each type of the RA procedure may support CBRA and/or CFRA. For example, an RA procedure with 4-step RA type may be a 4-step CFRA or a 4-step CBRA. An RA procedure with 2-step RA type may be a 2-step CFRA or a 2-step CBRA. Examples of the various types of RA procedure are described with reference to FIGS. 1, 2, 3 and 4.

FIG. 1 illustrates an example of a CBRA with 4-step RA type according to an implementation of the present disclosure. As illustrated, the CBRA with 4-step RA type includes actions 102, 104, 106 and 108.

In action 102, a UE 120 may transmit a MSG1 including an RA preamble to a BS 140.

In action 104, the BS 140 may transmit a MSG2 (e.g., an RAR) to the UE 120 in response to receiving the MSG1.

In action 106, the UE 120 may transmit a MSG3 to the BS 140 in a scheduled transmission (e.g., scheduled by the RAR).

In action 108, the UE 120 may receive a MSG4 (e.g., including a contention resolution message) from the BS 140.

Figure 2:
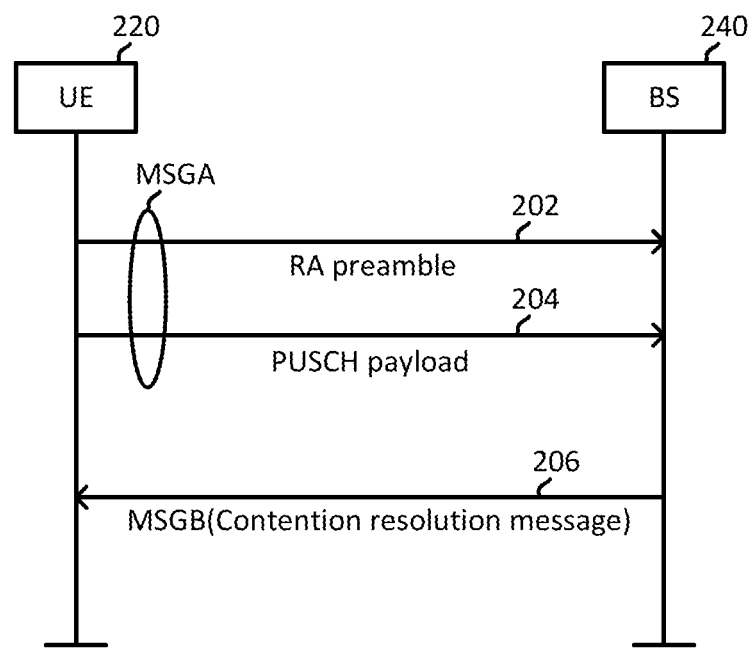
FIG. 2 illustrates an example of a CBRA with 2-step RA type in accordance with an implementation of the present disclosure.

FIG. 2 illustrates an example of a CBRA with 2-step RA type in accordance with an implementation of the present disclosure. The CBRA with 2-step RA type may include actions 202, 204 and 206, where action 202 together with action 204 may be considered a MSGA transmission for the UE 220.

As illustrated in FIG. 2, in action 202, an RA preamble may be transmitted, and in action 204, a PUSCH payload may be transmitted.

In action 206, the UE may receive MSGB that includes a contention resolution message from the BS 204.

Figure 3:
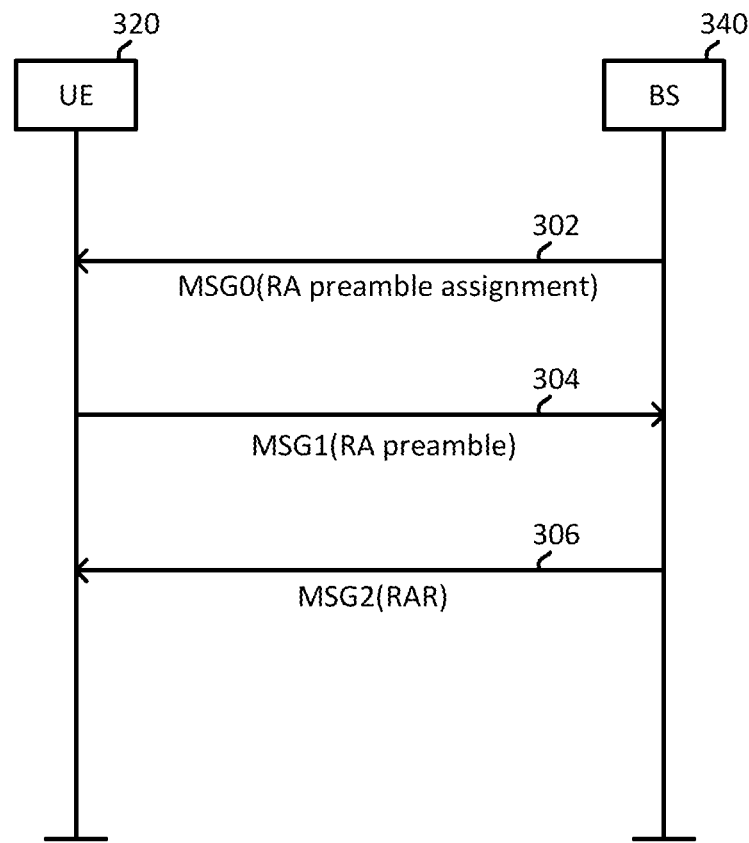
FIG. 3 illustrates an example of a CFRA with 4-step RA type in accordance with an implementation of the present disclosure.

FIG. 3 illustrates an example of a CFRA with 4-step RA type in accordance with an implementation of the present disclosure.

As illustrated in FIG. 3, a UE 320 may receive an RA preamble assignment (e.g., via MSG0) from a BS 340 in action 302. The RA preamble assignment may indicate a resource allocation of an RA preamble transmission. The UE 320 may transmit a MSG1 (e.g., including an RA preamble) according to the indicated resource allocation in action 304.

In action 306, a MSG2 (e.g., an RAR), as a response to the MSG1, may be received by the UE 320.

Figure 4:
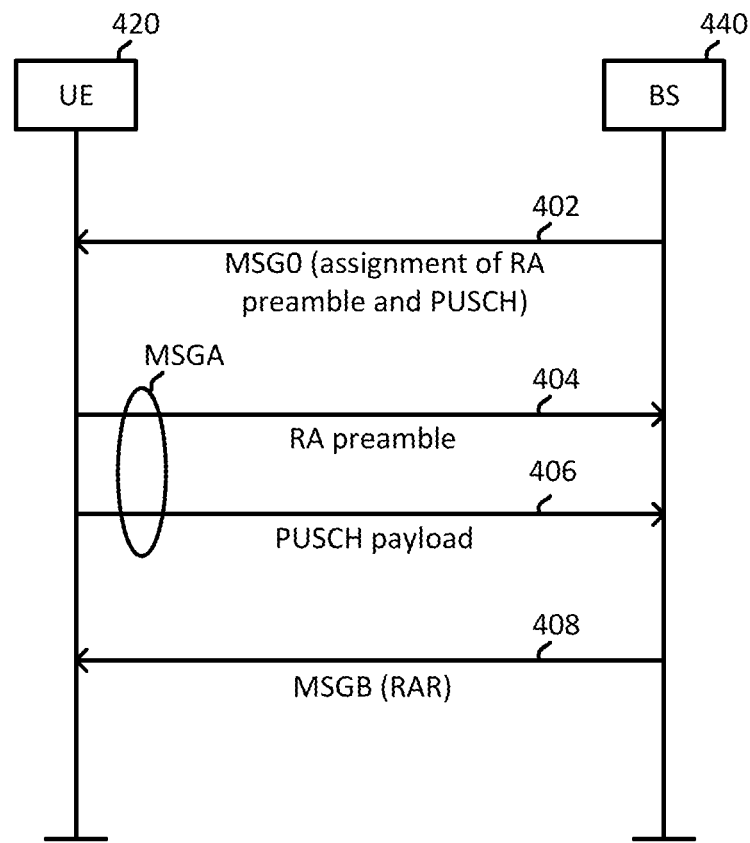
FIG. 4 illustrates an example of a CFRA with 2-step RA type in accordance with an implementation of the present disclosure.

FIG. 4 illustrates an example of a CFRA with 2-step RA type in accordance with an implementation of the present disclosure.

As illustrated in FIG. 4, the CFRA with 2-step RA type may include actions 402, 404, 406 and 408.

In action 402, a UE 420 may receive an assignment of an RA preamble transmission and an assignment of a PUSCH transmission from a BS 440 via a MSG0.

After the MSG0 reception, the UE 420 may perform a MSGA transmission. As illustrated in FIG. 4, an RA preamble and a PUSCH payload, which are included in the MSGA, may be transmitted by the UE 420 in actions 404 and 406, respectively.

In action 408, a MSGB (e.g., an RAR), as a response to the MSGA, may be received by the UE 420. The UE 420 may end the RA procedure (or consider the RA procedure completed) upon the MSGB reception.

For an RA procedure with 2-step RA type (e.g., 2-step CFRA or 2-step CBRA), a MSGA transmission may include a (RA) preamble transmission on a PRACH and a payload transmission on a PUSCH. After the MSGA transmission, the UE may monitor a response from the network within a configured time window (e.g., MSGB response window).

For example, for a 2-step CFRA, the UE may end the RA procedure (or consider the RA procedure completed) upon receiving the network response, as illustrated in FIG. 4. For a 2-step CBRA, if the contention resolution is considered successful upon receiving the network response (e.g., a contention resolution message), the UE may end the RA procedure, as illustrated in FIG. 2.

Figure 5:
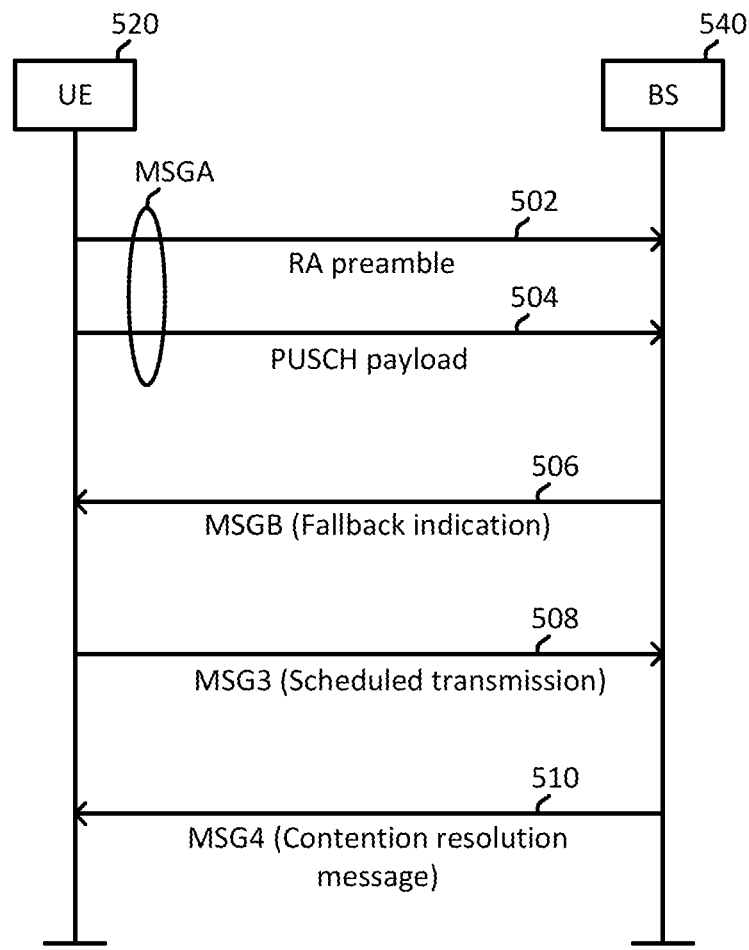
FIG. 5 illustrates a process of fallback from an RA procedure with 2-step RA type to an RA procedure with 4-step RA type, in accordance with an implementation of the present disclosure.

FIG. 5 illustrates a process of fallback from an RA procedure with 2-step RA type to an RA procedure with 4-step RA type, in accordance with an implementation of the present disclosure. The fallback mechanism may be achieved by including a fallback indication in a MSGB.

As illustrated in FIG. 5, a UE 520 may transmit an RA preamble and a PUSCH payload to a BS 540 in actions 502 and 504, respectively. The RA preamble and the PUSCH payload may refer to a MSGA.

In action 506, the UE 520 may receive a MSGB that includes a fallback indication from a BS 540. The UE 520 may fall back to RA procedure with 4-step RA type according to the fallback indication. As illustrated in FIG. 5, if the fallback indication is received in the MSGB, the UE 520 may perform a MSG3 transmission in action 508 and monitor/receive a MSG4 (a contention resolution message) in action 510.

If contention resolution is not successful after the MSG3 (re)transmission(s), the UE 520 may perform MSGA transmission(s) again. If the RA procedure with 2-step RA type still cannot complete after a number of MSGA transmissions, the UE may switch the RA procedure to a 4-step CBRA.

For an RA procedure initiated in a cell configured with an SUL, the network may explicitly indicate to the UE which carrier to use (e.g., to use an UL or the SUL). Otherwise, the UE may select the SUL to use if and only if the measured quality of the DL (e.g., RSRP value) is lower than a threshold broadcast by the network. The UE may perform the carrier selection before the RA type selection (e.g., to select a 2-step RA type or a 4-step RA type). An RSRP threshold for selecting the RA type may be configured separately for an UL and an SUL. Once started, all uplink transmissions of the RA procedure may be performed on the selected carrier.

When CA is configured, an RA procedure with 2-step RA type may only be performed on a PCell. For an RA procedure with 4-step RA type, the transmission/reception of MSG1, MSG2 and MSG3 for CBRA may always occur on a PCell, and the MSG4 (contention resolution) transmission/reception may be cross-scheduled by the PCell, e.g., on an SCell. On the other hand, the transmission/reception of MSG1, MSG2 and MSG3 for CFRA may occur on a PCell. A CFRA on an SCell may only be initiated by the gNB to establish the timing advance for a secondary TAG. For example, the CFRA procedure may be initiated by the gNB with a PDCCH order that is sent on a scheduling cell of an activated SCell of the secondary TAG, a preamble transmission may then take place on the indicated SCell, and an RAR may be received on the PCell.

An RA procedure may be triggered by at least one of the following events:
Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g., handover);
Transition from RRC_INACTIVE;
To establish time alignment for a secondary TAG;
Request for Other SI;
Beam failure recovery.

Handover (e.g., Request by RRC upon synchronous reconfiguration) may be performed by a UE (in RRC_CONNECTED state) for cell level mobility.

Figure 6:
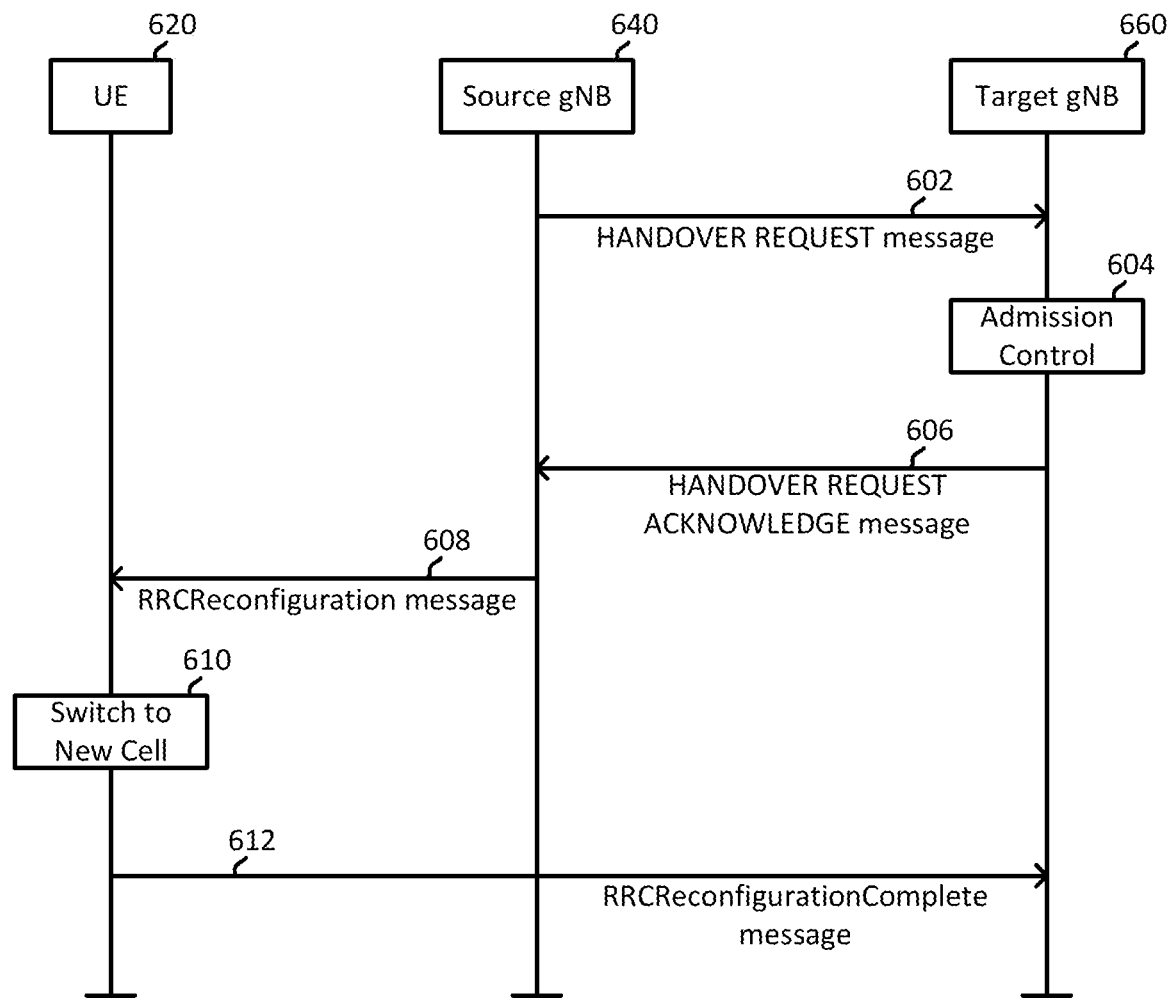
FIG. 6 illustrates an inter-Next-Generation Node B (inter-gNB) handover procedure in accordance with an implementation of the present disclosure.

Cell level mobility may require using explicit RRC signaling to trigger handover, as illustrated in FIG. 6.

FIG. 6 illustrates an inter-gNB handover procedure in accordance with an implementation of the present disclosure.

In action 602, the source gNB 640 may initiate handover and transmit a HANDOVER REQUEST message to the target gNB 660 over the Xn interface.

In action 604, the target gNB 660 may perform admission control.

In action 606, the target gNB 660 may provide new RRC configuration(s) as part of a HANDOVER REQUEST ACKNOWLEDGE message.

In action 608, the source gNB 640 may provide the RRC configuration to the UE 620 by forwarding an RRCReconfiguration message obtained from the HANDOVER REQUEST ACKNOWLEDGE message to the UE 620.

The RRCReconfiguration message may include at least one cell ID and all information required to access the target cell 620. With the RRCReconfiguration message, the UE 620 may access the target cell 660 without reading the system information. In some implementations, the information required for CBRA and CFRA may be included in the RRCReconfiguration message. The information required to access the target cell 620 may include beam specific information.

In action 610, the UE 620 may switch the RRC connection to the target gNB 660.

In action 612, the UE 620 may reply the target gNB 660 with an RRCReconfigurationComplete message.

User Data may be sent in the RRCReconfigurationComplete message if the grant allows.

The handover mechanism triggered by an RRC entity may require a UE to reset the MAC entity and re-establish the RLC entity. The RRC entity may manage handover with or without PDCP entity re-establishment. For DRBs using RLC AM mode, the PDCP entity may either be re-established together with a security key change or initiate a data recovery procedure without a key change. For DRBs using RLC UM mode and for SRBs, the PDCP entity may either be re-established together with a security key change or remain as it is without a key change.

Data forwarding, in-sequence delivery and duplication avoidance at handover, may be guaranteed when the target gNB uses the same DRB configuration as the source gNB.

Timer-based handover failure procedures may be supported in NR. An RRC connection re-establishment procedure may be used for recovering from handover failure.

The handover preparation phase and the handover execution phase of a handover procedure (e.g., intra-NR RAN handover) may be performed without the involvement of the 5GC. For example, in these phases, preparation messages may be directly exchanged between gNBs. The release of the resources at the source gNB during the handover completion phase may be triggered by the target gNB.

Figure 7A:
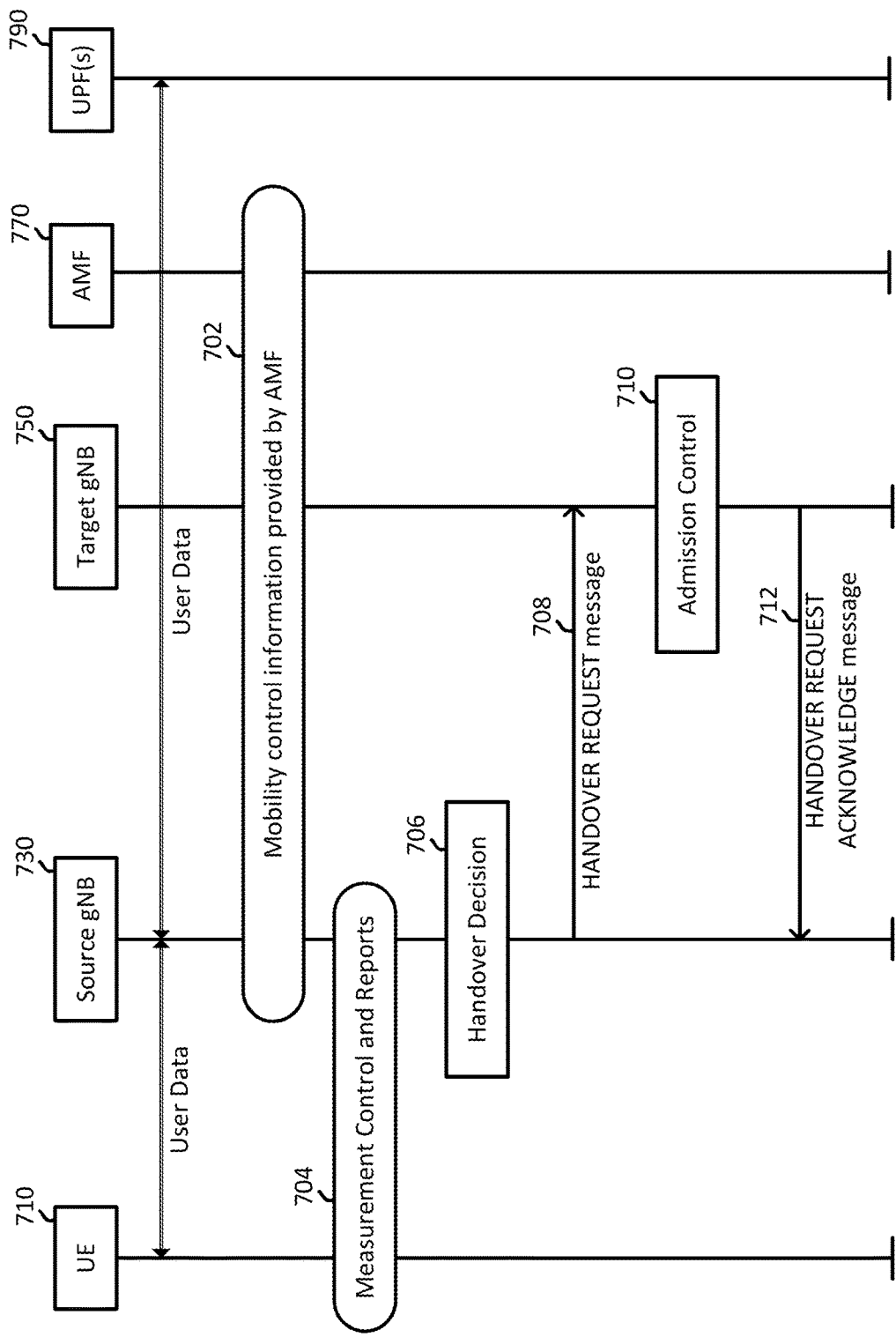
FIG. 7A illustrates the handover preparation phase of the handover procedure of FIG. 6.
Figure 7B:
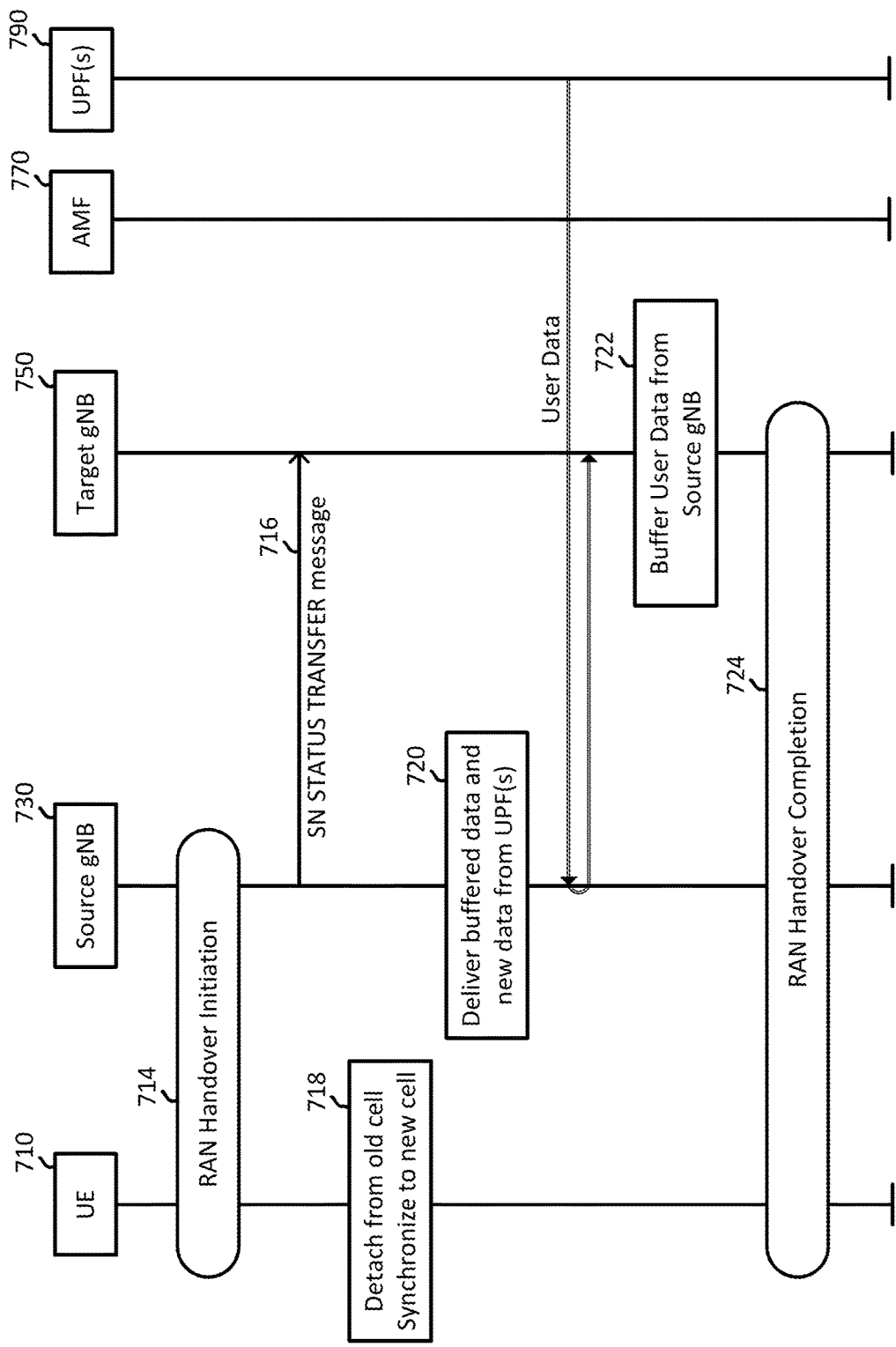
FIG. 7B illustrates the handover execution phase of the handover procedure of FIG. 6.
Figure 7C:
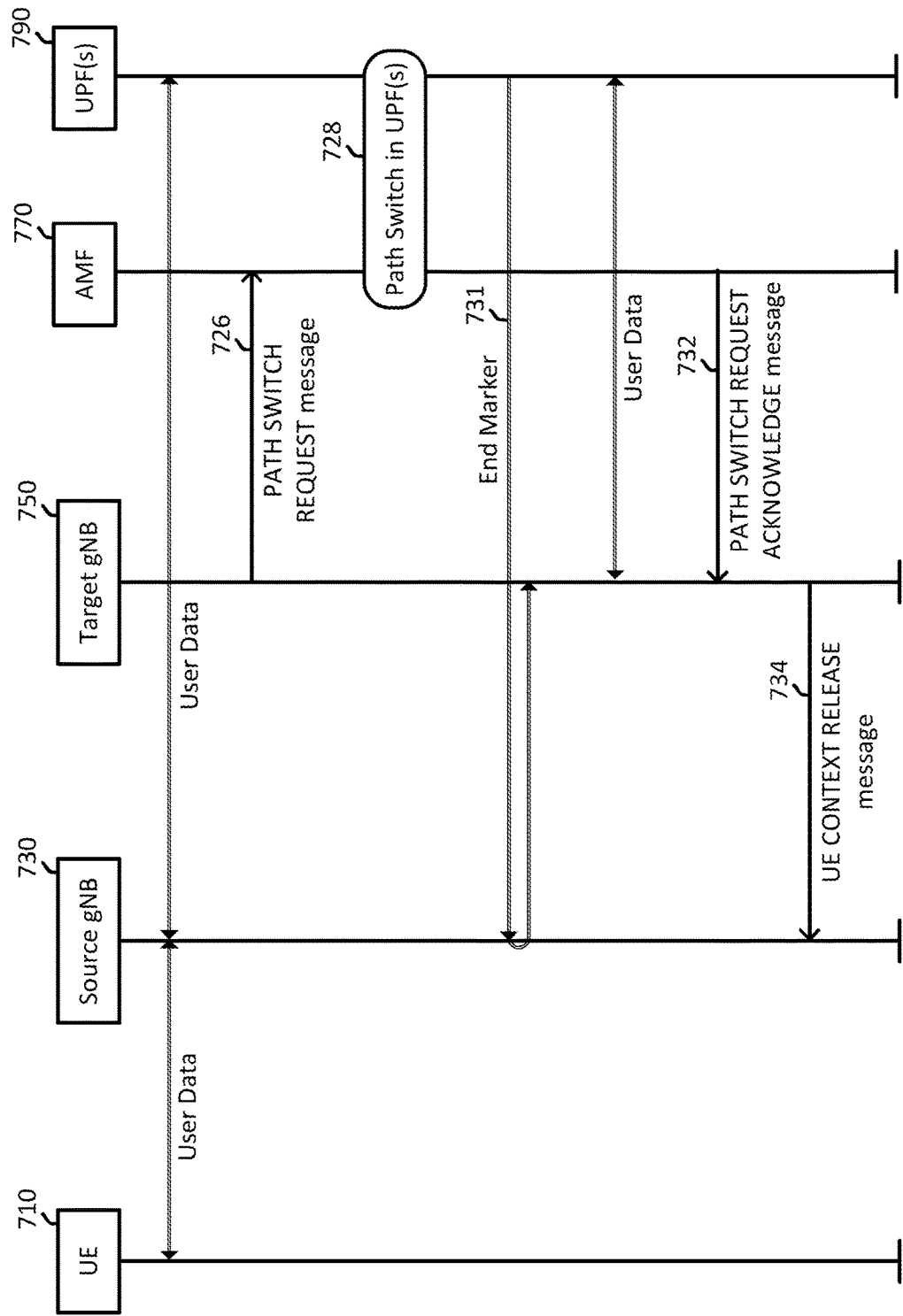
FIG. 7C illustrates the handover completion phase of the handover procedure of FIG. 6.

FIG. 7A illustrates the handover preparation phase of the handover procedure of FIG. 6. FIG. 7B illustrates the handover execution phase of the handover procedure of FIG. 6. FIG. 7C illustrates the handover completion phase of the handover procedure of FIG. 6. For the handover procedure, neither AMF nor UPF changes.

Refer to FIG. 7A. In action 702, mobility control information may be provided by the AMF 770. The UE context within the source gNB 730 may contain the mobility control information regarding roaming and access restrictions which were provided either at connection establishment or at the last TA update.

In action 704, the source gNB 730 may provide the UE 710 with measurement configurations. The UE 710 may perform measurements and transmit measurement report(s) (e.g., MeasurementReport) to the source gNB 730 according to the measurement configuration.

In action 706, the source gNB 730 may make a handover decision based on the MeasurementReport and/or RRM information. For example, the source gNB 730 may decide to handover the UE 710 based on the MeasurementReport and the RRM information.

In action 708, the source gNB 730 may transmit a Handover Request message to the target gNB 750 in order to pass a transparent RRC container with specific information to prepare the handover at the target side. The specific information may include a target cell ID, KgNB*, a C-RNTI of the UE 710 in the source gNB 730, the RRM-configuration including UE inactive time, basic AS-configuration including antenna Info and DL Carrier Frequency, the current QoS flow to DRB mapping rules applied to the UE 710, the SIB1 from the source gNB 730, the UE capabilities for different RATs, PDU session related information. The specific information may further include the UE-reported measurement information including beam-related information (if available). The PDU session related information may include the slice information and QoS flow level QoS profile(s).

After transmitting the Handover Request message, the source gNB 730 may not reconfigure the UE. For example, the source gNB 730 may not map the Reflective QoS flow to the DRB.

In action 710, the target gNB 750 may perform admission control. Slice-aware admission control may be performed if the slice information is sent to the target gNB. If the PDU sessions are associated with non-supported slices, the target gNB may reject the PDU sessions.

In action 712, the target gNB 750 may prepare handover with L1/L2 and send the HANDOVER REQUEST ACKNOWLEDGE message to the source gNB 730. The HANDOVER REQUEST ACKNOWLEDGE message may include a transparent container as an RRC message to be sent to the UE 710 to perform the handover.

FIG. 7B illustrates the handover execution phase of the handover procedure, which may be subsequent to the handover preparation phase as illustrated in FIG. 7A.

In action 714, the source gNB 730 may trigger RAN handover (or Uu handover) by sending an RRCReconfiguration message to the UE 710. The RRCReconfiguration message may contain information required to access a target cell of the target gNB 750. For example, the information may include at least one of a target cell ID, a new C-RNTI, and target gNB security algorithm identifiers for the selected security algorithms. The information may also include a set of dedicated RACH resources, the association between RACH resources and SSB(s), the association between RACH resources and UE-specific CSI-RS configuration(s), common RACH resources, and system information of the target cell, etc.

In action 716, the source gNB 730 may send an SN STATUS TRANSFER message to the target gNB 750.

In action 718, the UE 710 may detach from the old cell (e.g., a cell of the source gNB 730) and synchronize to the target cell of the target gNB 750.

In action 720, the source gNB 730 may deliver buffered data and new data received from the UPF(s) 790 to the target gNB 750.

In action 722, the target gNB 750 may buffer the user data from the source gNB 730.

In action 724, the UE 710 may complete the RAN handover procedure by sending an RRCReconfigurationComplete message to the target gNB 750.

FIG. 7C illustrates the handover completion phase of the handover procedure, which may be subsequent to the handover execution phase as illustrated in FIG. 7B.

In action 726, the target gNB 720 may send a PATH SWITCH REQUEST message to the AMF 770 to trigger the 5GC to switch the DL data path towards the target gNB 750 and to establish an NG-C interface instance towards the target gNB 750.

In action 728, the 5GC (in which the AMF 770 and the UPF(s) 790 are included) may switch the DL data path towards the target gNB 750. The UPF(s) 790 may send one or more "end marker" packets on the old path to the source gNB 730 based on a per-PDU session basis or a per-tunnel basis and release any U-plane/TNL resources towards the source gNB 730 in action 731.

In action 732, the AMF 770 may confirm the PATH SWITCH REQUEST message and transmit a PATH SWITCH REQUEST ACKNOWLEDGE message to the target gNB 750.

In action 734, upon reception of the PATH SWITCH REQUEST ACKNOWLEDGE message from the AMF 770, the target gNB 750 may send a UE CONTEXT RELEASE message to inform the source gNB 730 of the success of the handover. The source gNB 730 may then release the radio resources and the C-plane-related resources associated with the UE context. Any ongoing data forwarding may continue.

For a 2-step CBRA or CFRA procedure, there are some assumptions (1 to 21) as follows:

1. Configurations of 2-step RA and/or 4-step selection may be based on indicating to all UEs via SIB, or dedicated configuration in RRC_CONNECTED/RRC_INACTIVE/IDLE state.

2. UE may retry MSGA retransmission (e.g., preamble and PUSCH) for 2-step RA if an attempt of the 2-step RA fails.

3. For a MSGA with a C-RNTI, the UE may monitor the PDCCH addressed to the C-RNTI for success response and/or MSGB-RNTI.

4. For contention resolution of the 2-step RACH procedure, 4-1. if the PDU PDCCH addressed to the C-RNTI (e.g., the C-RNTI included in the MSGA) containing a 12-bit TA command is received, the UE may consider the contention resolution to be successful and stop the reception of MSGB or with UL grant if the UE is synchronized already;

4-2. if the corresponding fallback RAR is detected, the UE may stop monitoring the PDCCH addressed to the corresponding C-RNTI for successful response and process the fallback operation accordingly;

4-3. if neither corresponding fallback RAR nor PDCCH addressed to the C-RNTI is detected within the response window, the UE may consider the MSGA attempt failed and do back off operation based on the backoff indicator if received in MSGB.

5. Network response to MSGA (e.g., MSGB/MSG2) may include the following: SuccessRAR, FallbackRAR, and/or Backoff Indication.

6. The following fields may be included in the successRAR when CCCH message is included in MSGA: Contention resolution ID, C-RNTI, and/or TA command.

7. Upon receiving the fallbackRAR, the UE shall proceed to MSG3 step of 4-step RACH procedure.

8. FallbackRAR may contain the following fields: RAPID, UL grant (to retransmit the MSGA payload), TC-RNTI, and/or TA command.

9. RA type selection (e.g., to select 2-step RA or 4-step RA) is performed before beam selection.

10. No need to re-execute RA selection criteria upon fallback failure (i.e., if the reception of MSG3 fails). The UE re-transmits using MSGA.

11. Network may configure the number of times "N," a UE may attempt to re-transmit MSGA for "N" times during the RA procedure.

12. RA type selection is NOT left up to UE implementation.

13. If the UE is configured with 2-step RA, the RSRP is above a configurable threshold then the UE shall use the RA procedure with 2-step RA type.

14. 2-step RACH resources may only be configured on SpCell.

15. The 2-step RACH resources may be configured on a BWP where 4-step CBRA resources are not configured. In that case we may not have 4-step switch.

16. The 2-step CBRA for SpCell BFR is supported in Rel-16.

17. If 4-step CFRA resource is configured, the UE may select 4-step RACH in RA procedure initialization.

18. If no qualified beam with 4-step CFRA resource can be found, the UE may fallback to 4-step CBRA. Assumption: 2-step CFRA and 4-step CFRA are not configured at the same time.

19. For random access initiated by PDCCH order, if PDCCH order includes non-zero RA preamble index, UE selects 4 step RA. For example, UE may perform legacy CFRA.

20. Allow configurations where switching to 4-step RA is not supported even when 2-step RA and 4-step RA are configured in the BWP.

21. HARQ process ID 0 is used for MSGA PUSCH transmission.

For 2-step (CF) RA procedure, e.g., 2-step CFRA triggered for handover, there are some assumptions (1 to 9) as follows:

1. 2-step CFRA and 4-step CFRA cannot be configured simultaneously for a BWP.

2. For 2-step CFRA for handover, the UE may monitor the PDCCH of the target cell for the response from the gNB identified by the C-RNTI while the msgB-Response Window is running. The RA procedure is considered successful upon reception of a transmission addressed to the C-RNTI containing at least the 12 bit TAC MAC CE.

3. Rebuilding is NOT supported: This means the CFRA payload size matches one of the payload sizes for CBRA and UE includes C-RNTI in MSGA for CFRA.

4. In the case of 2-step CFRA, once MSGA is transmitted the UE monitors MSGB-RNTI (in addition to C-RNTI—i.e. same as CBRA).

5. The initial RA type is always determined to be 2-step RA if 2-step CFRA is configured in handover.

6. Similar to 4-step RA, the UE then searches for a suitable CFRA beam with configured CFRA resources for 2-step RA type.

7. RAN2 assumes that SSB and CSI-RS based 2-step CFRA can be supported. We assume that if there are RAN1 impact then CSI-RS configuration may not be supported.

8. The PUSCH resource for 2-step CFRA associated with the dedicated preamble may be configured to the UE via dedicated signaling (e.g., may not be included in SIB1).

9. 2-step CFRA is configured only on BWP where 2-step CBRA is configured.

In one implementation, the RRC parameters for MSGA PRACH (e.g., 2-step RA resource) may be as listed in Table 1.

TABLE 1

| Parameter Name | Values |
| --- | --- |
| msgA-prach-ConfigurationIndex | INTEGER (0 . . . [255]) |
| msgA-RO-FDM | ENUMERATED {one, two, four, eight} |
| msgApreamble-powerRampingStep | ENUMERATED {dB0, dB2, dB4, dB6} |
| msgA-CB-PreamblesPerSSB | Same value range as CB-PreamblesPerSSB |
| msgA-ssb-sharedROmaskindex | INTEGER (0 . . . 15) |

In one implementation, RRC parameters for MSGA PUSCH (e.g., PUSCH resource for 2-step RA) may be as listed in Table 2.

TABLE 2

| Parameter Name | Values |
| --- | --- |
| guardPeriodMsgAPUSCH | INTEGER {0, 1, 2, 3}, 2 bits In the unit of symbols |
| nrofMsgAPOperSlot | INTEGER {1, 2, 3, 6}, 2 bits |
| nrofSlotsMsgAPUSCH | INTEGER {1, 2, 3, 4}, 2 bits |
| nrMsgAPO-FDM | INTEGER {1, 2, 4, 8}, 2 bits |
| msgA-Alpha | Same range as MSG3 ENUMERATED {alpha0, alpha04, alpha05, alpha06, alpha07, alpha08, alpha09, alpha1}, 3 bits |
| msgAPUSCH-timeDomainOffset | INTEGER (1 . . . 32), 5 bits |
| nrofInterlacesPerMsgAPO | INTEGER {1 . . . 10} for 15 kHz, INTEGER {1 . . . 5} for 30 kHz, 4 bits |
| interlaceIndexFirstPOMsgAPUSCH | INTEGER {1 . . . 10} for 15 kHz, INTEGER {1 . . . 5} for 30 kHz, 4 bits |

Figure 8:
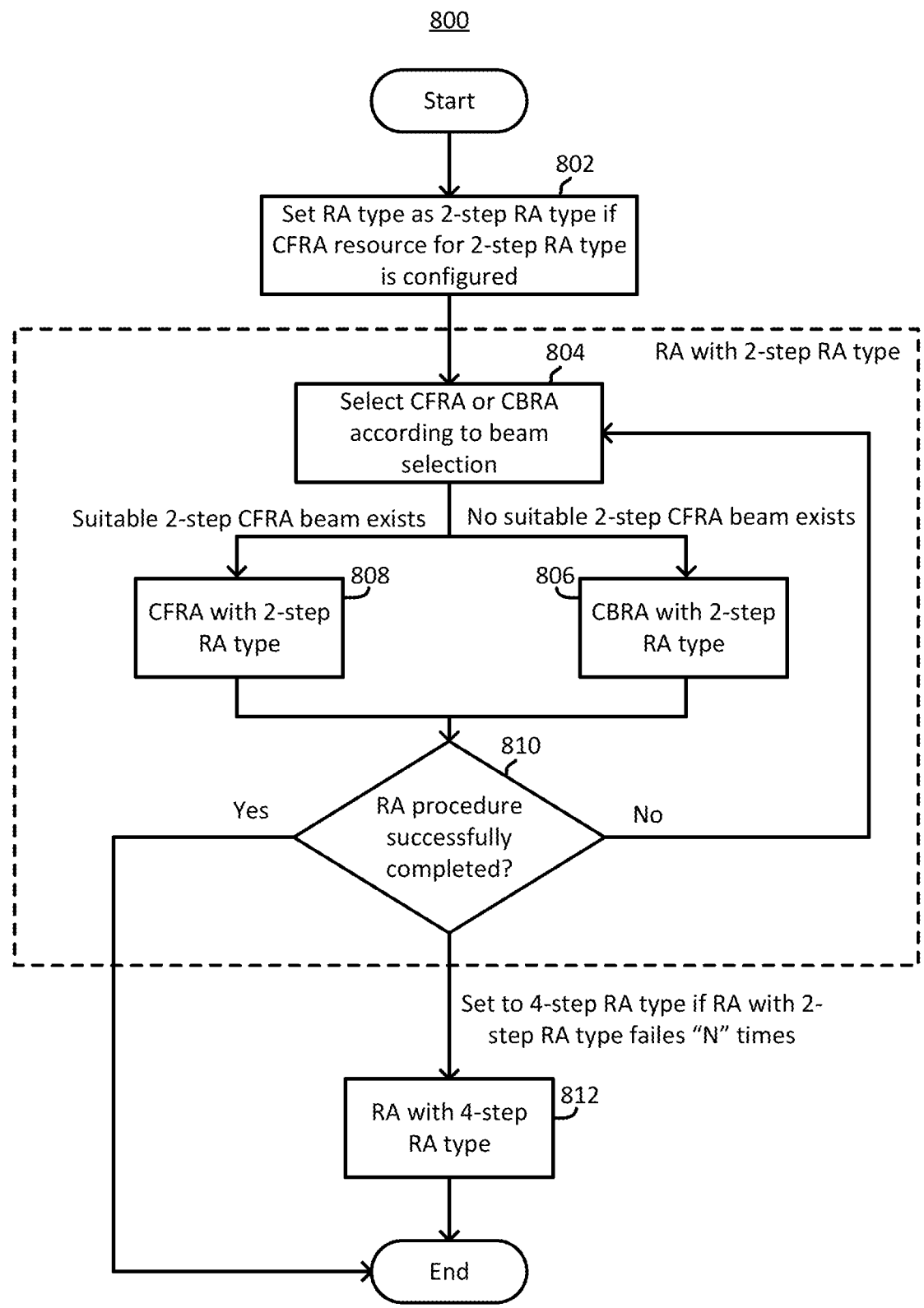
FIG. 8 illustrates an RA procedure in accordance with an implementation of the present disclosure.

FIG. 8 illustrates an RA procedure in accordance with an implementation of the present disclosure.

As illustrated in FIG. 8, in action 802, a UE may set the RA type of an RA procedure as "2-step RA type" if a CFRA resource for 2-step RA type is configured. Then, an RA (procedure) with 2-step RA type is performed.

In action 804, the UE may select which type (CFRA or CBRA) of 2-step RA to perform according to beam (e.g., SSB and/or CSI-RS) selection. For example, if the UE determines that no suitable/qualified 2-step CFRA beam (i.e., CF 2-step RA type Resources associated with SSBs) exists, the UE may perform CBRA with 2-step RA type as the RA procedure in action 806. If the UE determines that at least one suitable/qualified 2-step CFRA beam exists, the UE may perform CFRA with 2-step RA type as the RA procedure in action 808. The UE may determine whether there is suitable/qualified 2-step CFRA beam exists based on if the CF 2-step RA type Resources associated with SSBs have been explicitly provided in rach-ConfigDedicated and at least one SSB with SS-RSRP above msgA-RSRP-ThresholdSSB amongst the associated SSBs is availableIn action 810, the UE may determine whether the RA procedure (with 2-step RA type) is successfully completed.

If the RA procedure is successfully completed, the RA procedure ends.

Conversely, if the RA procedure is not successfully completed (or fails), the flowchart may go back to action 804, in which the UE may reselect the type (CFRA or CBRA) of the RA procedure with 2-step RA type according to the beam selection result.

If the RA (procedure) with 2-step RA type fails N times, where N may be a predetermined positive integer, the UE may set the RA type of the RA procedure to "4-step RA type," and fall back to perform RA with 4-step RA type in action 812. The "N" may be configured by a parameter msgA-TransMax.

Release of Dedicated Resources for 2-Step CFRA

Lower network access latency may be achieved by an RA procedure with 2-step RA type since it requires less execution time than an RA procedure with 4-step RA type (e.g., by reduced number of RTTs). An inherent-unpredictable part of the RA latency may be RA failure with RA re-attempts (possibly preceded by a backoff period), which may result from possible preamble collisions discovered in the RAR reception and/or contention resolution phase.

The risk for the potential additional latency may be removed (or reduced) by providing the UE with a CFRA preamble and/or resources. A CFRA for handover may be applicable for 2-step RA type. However, 2-step CFRA configurations may be costly, because they may tie up CFRA resources and dedicated PUSCH resources, causing that these resources may not be reserved for a longer time than necessary. In the present disclosure, various implementations are provided to address this issue.

In one implementation, a UE may discard the explicitly-signaled CFRA resources for 2-step RA type (e.g., the CFRA resources for 2-step RA type explicitly signalled/configured by the network) and/or the dedicated PUSCH resources for a 2-step RA type (e.g., dedicated msgA PUSCH resources) upon (or when) (successful) completion of a (2-step) RA procedure. The RA procedure may be an RA procedure with 2-step RA type at the initialization, or an RA procedure with 4-step RA type once the RA type is set to the 4-step RA type. The RA procedure may be requested/initiated by RRC upon synchronous reconfiguration (e.g., handover).

In one implementation, if a UE receives an RRCReconfiguration (with reconfigurationWithSync) message from a network node, the UE may initiate an RA procedure with a 2-step RA type if the CFRA resources for 2-step RA and/or the dedicated PUSCH resource for 2-step RA are configured. The RRCReconfiguration message may be specified in 3GPP TS 38.331 V15.7.0.

Upon (or when) (successful) completion of the RA procedure (with the 2-step RA type), the UE may discard the explicitly-signalled CFRA resources for 2-step RA and/or the dedicated PUSCH resources for 2-step RA (e.g., dedicated msgA PUSCH resources).

In one implementation, the UE may discard the explicitly-signalled CFRA resources for 2-step RA type and/or the dedicated PUSCH resources for 2-step RA (e.g., dedicated msgA PUSCH resources) if (or when) the UE sets the RA type of an RA procedure from 2-step RA type to 4-step RA type. The RA procedure may be an RA procedure with 2-step RA type at the initialization. The RA procedure may be an RA procedure with 4-step RA type once the RA type is set to 4-step RA type. The RA procedure may be requested/initialized by RRC upon synchronous reconfiguration (e.g., handover).

If the UE receives an RRCReconfiguration (with reconfigurationWithSync) message from a network node, the UE may initiate an RA procedure with a 2-step RA type if the CFRA resources for 2-step RA type and/or if the dedicated PUSCH resource for 2-step RA (e.g., dedicated msgA PUSCH resources) are configured. If (or when) the UE sets the RA type of an RA procedure from a 2-step RA type to a 4-step RA type (e.g., the parameter RA_TYPE is set to 4-step RA), the UE may discard the explicitly-signalled CFRA resources for 2-step RA type and/or the dedicated PUSCH resources for 2-step RA (e.g., dedicated msgA PUSCH resources).

In one implementation, an RRC parameter msgA-TransMax may be used to define the maximum number of MSGA preamble transmissions performed before the RA procedure is switched/set. The msgA-TransMax may only be applicable when 2-step and 4-step RA type are configured and switching to 4-step type RA is supported. If the msgA-TransMax is absent, switching from 2-step RA type to 4-step RA type may not be allowed.

For example, a UE may be configured with a specific value "N" by the network (e.g., via msgATransMax). The UE may attempt to (re-)transmit MSGA (preamble transmission) up to "N" times in one RA procedure (with 2-step RA type). If the RA procedure cannot successfully complete after the "N" times MSGA preamble transmissions the UE may set the RA type from the 2-step RA type to the 4-step RA type. In one implementation, if the number of MSGA preamble transmissions reaches to N (e.g., the value indicated by msgATransMax), the UE may set the RA type from the 2-step RA type to the 4-step RA type, as illustrated in FIG. 8.

In one implementation, the UE may set the RA_TYPE to 4-stepRA (i.e., the RA type of the RA procedure is set to the 4-step RA type) if msgATransMax is configured and/or applied and PREAMBLE_TRANSMISSION_COUNTER=msgATransMax+1, where the variable PREAMBLE_TRANSMISSION_COUNTER of the UE represents the value of a (RA and/or MSGA) preamble transmissions.

An example of the corresponding UE (or MAC entity) operation is in Table 3.

TABLE 3

Example

Once the MSGA preamble is transmitted, regardless of the possible occurrence of a measurement gap, the MAC entity may:
```
1> if msgB -ResponseWindow expires, and the RAR Reception has not been considered as
    successful based on descriptions above:
    2> increment PREAMBLE_TRANSMISSION_COUNTER by 1;
    2> if PREAMBLE_TRANSMISSION_COUNTER = preambleTransMax + 1:
        3> indicate a Random Access problem to upper layers;
        3> if this Random Access procedure was triggered for SI request:
            4> consider this Random Access procedure unsuccessfully completed.
    2> if the RA procedure is not completed:
        3> if msgATransMax is configured and/or applied, and
                PREAMBLE_TRANSMISSION_COUNTER = msgATransMax + 1:
            4> set the RA_TYPE to 4-stepRA;
            4> perform initialization of variables specific to random access type;
            4> if the MSG3 buffer is empty:
                5> obtain the MAC PDU to transmit from the MSGA buffer and store it in the
                    MSG3 buffer;
            4> flush HARQ buffer used for the transmission of MAC PDU in the MSGA
                buffer;
            4> discard explicitly-signalled CF2-step RA type RA Resources and/or dedicated
                PUSCH resources for 2-step RA (e.g., dedicated msgA PUSCH resources), if
                any;
            4> perform the Random Access Resource selection procedure.
        3> else:
            4> select a random back-off time according to a uniform distribution between 0
                and the PREAMBLE_BACKOFF;
            4> perform the Random Access Resource selection procedure for 2-step random
                access after the back-off time.
```

In one implementation, the UE may discard the explicitly-signaled CFRA resources for 2-step RA type and/or the dedicated PUSCH resources for 2-step RA (e.g., dedicated msgA PUSCH resources) if (or when) an RA problem is indicated (e.g., the MAC entity of the UE may indicate an RA problem to upper layers) and/or the RA procedure is unsuccessfully completed. The RA procedure may be an RA procedure with 2-step RA type at the initialization. The RA procedure may be requested by RRC upon synchronous reconfiguration (e.g., handover).

In one implementation, if a UE receives an RRCReconfiguration (with reconfigurationWithSync) message from a network node, the UE may initiate an RA procedure with a 2-step RA type if CFRA resources for 2-step RA and/or dedicated PUSCH resource for 2-step RA (e.g., dedicated msgA PUSCH resources) are configured. If (or when) an RA problem (e.g., the MAC entity of the UE may indicate an RA problem to upper layers) is indicated/declared and/or the RA procedure is unsuccessfully completed, the UE may discard the explicitly-signalled CFRA resources for 2-step RA and/or the dedicated PUSCH resources for 2-step RA (e.g., dedicated MSGA PUSCH resources).

The UE may indicate an RA problem (e.g., the MAC entity of the UE may indicate an RA problem to upper layers) and/or consider the RA procedure is unsuccessfully completed if PREAMBLE_TRANSMISSION_COUNTER=preambleTransMax+1.

In one implementation, an RRC parameter preambleTransMax may be used to define the maximum number of RA preamble (e.g., MSG1 preamble) transmissions performed before declaring a failure (e.g., RLF) and/or indicating an RA problem (e.g., the MAC entity of the UE may indicate an RA problem to upper layers).

In one implementation, the UE may discard the explicitly-signalled CFRA resources for 2-step RA type and/or the dedicated PUSCH resources for 2-step RA (e.g., dedicated msgA PUSCH resources) if (or when) PREAMBLE_TRANSMISSION_COUNTER= preambleTransMax+1.

For example, if the UE receives an RRCReconfiguration (with reconfigurationWithSync) message from a network node, the UE may initiate an RA procedure with a 2-step RA type if the CFRA resources for 2-step RA and/or the dedicated PUSCH resource for 2-step RA are configured. If (or when) PREAMBLE_TRANSMISSION_COUNTER= preambleTransMax+1, the UE may discard the explicitly-signalled CFRA resources for 2-step RA type and/or the dedicated PUSCH resources for 2-step RA (e.g., dedicated MSGA PUSCH resources).

In one implementation, the UE may discard the explicitly-signalled CFRA resources for 2-step RA type and/or the dedicated PUSCH resources for 2-step RA (e.g., dedicated MSGA PUSCH resources) if (or when) a TA timer (e.g., timeAlignmentTimer) expires and/or when the UE considers the TA timer as expired. The timeAlignmentTimer may be specified in 3GPP TS 38.331 V15.7.0.

For example, if a UE receives an RRCReconfiguration (with reconfigurationWithSync) message from a network node, the UE may initiate an RA procedure with a 2-step RA type if the CFRA resources for 2-step RA and/or the dedicated PUSCH resource for 2-step RA (e.g., dedicated msgA PUSCH resources) are configured. If (or when) a TA timer (e.g., timeAlignmentTimer) expires and/or when the UE considers the TA timer expired, the UE may discard the explicitly-signalled CFRA resources for 2-step RA and/or the dedicated PUSCH resources for 2-step RA (e.g., dedicated msgA PUSCH resources). n one implementation, the TA timer may be configured in the IE TAG-Config.

In one implementation, the UE may discard the explicit-signalled CFRA resources for 2-step RA type and/or the dedicated PUSCH resources for 2-step RA (e.g., dedicated msgA PUSCH resources) if (or when) the UE stops (or aborts) the RA procedure (with 2-step RA type). The RA procedure may be an RA procedure with 2-step RA type at the initialization. The RA procedure may be requested by RRC upon synchronous reconfiguration (e.g., handover).

In one implementation, if a UE receives an RRCReconfiguration (with reconfigurationWithSync) message from a network node, the UE may initiate an RA procedure with a 2-step RA type if the CFRA resources for 2-step RA and/or the dedicated PUSCH resource for 2-step RA are configured. If (or when) the UE stops (or abort) the RA procedure (with 2-step RA type), the UE may discard the explicitly-signalled CFRA resources for 2-step RA and/or the dedicated PUSCH resources for 2-step RA (e.g., dedicated msgA PUSCH resources).

If the UE decides to perform BWP switching, the UE may stop (or abort) the (ongoing) RA procedure with 2-step RA type and/or initiate a new RA procedure after performing the BWP switching.

Upon reception of RRC (re-)configuration for BWP switching for a serving cell (while an RA procedure with 2-step RA type associated with the serving cell is still ongoing at the UE), the UE may stop (or abort) the ongoing RA procedure with 2-step RA type (and initiate an RA procedure after performing the BWP switching).

If a beam failure recovery configuration (e.g., beamFailureRecoveryConfig, which is specified in 3GPP TS 38.331 V15.7.0) is reconfigured by upper layers while an RA procedure for beam failure recovery is ongoing, the UE may stop (or abort) the ongoing RA procedure with 2-step RA type (and initiate an RA procedure using the new configuration).

The UE may stop (or abort) the (ongoing) RA procedure with 2-step RA type if the UE resets the MAC entity.

The UE may stop (or abort) an ongoing RA procedure with 2-step RA type due to a pending SR procedure for which no valid PUCCH resources is configured. The SR procedure may be initiated by the MAC entity prior to the MAC PDU assembly. The RA procedure with 2-step RA type may be stopped when a MAC PDU is transmitted using a UL grant other than a UL grant provided by an RAR. The MAC PDU may include a BSR MAC CE which contains the buffer status up to (and including) the last event that triggered a BSR prior to the MAC PDU assembly, or when the UL grant(s) can accommodate all pending data available for transmission.

In one implementation, the UE may discard explicitly-signalled CFRA resources for 2-step RA type and/or dedicated PUSCH resources for 2-step RA (e.g., dedicated msgA PUSCH resources) if (or when) the UE resets its MAC entity. The RA procedure may be an RA procedure with 2-step RA type at the initialization. The RA procedure may be requested/initiated by RRC upon synchronous reconfiguration (e.g., handover).

In one implementation, if a UE receives an RRCReconfiguration (with reconfigurationWithSync) message from a network node, the UE may initiate an RA procedure with 2-step RA type if the CFRA resources for 2-step RA and/or the dedicated PUSCH resource for 2-step RA are configured. If (or when) the UE resets the MAC entity, the UE may discard the explicitly-signalled CFRA resources for 2-step RA type and/or the dedicated PUSCH resources for 2-step RA (e.g., dedicated msgA PUSCH resources).

In one implementation, the UE may reset the MAC entity upon the initiation of an RRC connection re-establishment procedure. For example, the RRC connection re-establishment procedure may be initiated by the UE when RLF of the MCG is detected, when reconfiguration with sync failure of the MCG is detected, when mobility from NR failure is detected, when an integrity check failure indication from lower layers concerning SRB 1 or SRB 2 is detected (except that if the integrity check failure is detected on the RRCReestablishment message), and/or when an RRC connection reconfiguration failure is detected.

In one implementation, the UE may discard the explicitly-signalled CFRA resources for 2-step RA type and/or the dedicated PUSCH resources for 2-step RA (e.g., dedicated msgA PUSCH resources) configured on a BWP if (or when) the BWP is deactivated. The RA procedure may be an RA procedure with 2-step RA type at the initialization. The RA procedure may be requested by RRC upon synchronous reconfiguration (e.g., handover).

In one implementation, if a UE receives an RRCReconfiguration (with reconfigurationWithSync) message from a network node, the UE may initiate an RA procedure with a 2-step RA type if the CFRA resources for 2-step RA and/or the dedicated PUSCH resource for 2-step RA are configured. If (or when) the BWP is deactivated, the UE may discard the explicitly-signalled CFRA resources for 2-step RA and/or the dedicated PUSCH resources for 2-step RA (e.g., dedicated msgA PUSCH resources). The RA procedure with 2-step RA type may be initiated and/or performed on the BWP.

BWP switching for a serving cell may activate an inactive BWP and deactivate an active BWP at a time. BWP switching may be controlled by a PDCCH indicating a DL assignment or an UL grant, by the bwp-InactivityTimer, by RRC signalling, or by the MAC entity itself upon initiation of RA procedure. The bwp-InactivityTimer may be specified in the 3GPP TS 38.331 V15.7.0.

An example of the corresponding UE operation is in Table 4.

TABLE 4

| Example |
|---|
| For each activated Serving Cell configured with a BWP, the MAC entity shall:<br>1> if a BWP is deactivated:<br>    2> not transmit on UL-SCH on the BWP;<br>    2> not transmit on RACH on the BWP;<br>    2> not monitor the PDCCH on the BWP;<br>    2> not transmit PUCCH on the BWP;<br>    2> not report CSI for the BWP;<br>    2> not transmit SRS on the BWP;<br>    2> not receive DL-SCH on the BWP;<br>    2> clear any configured downlink assignment and configured uplink grant of configured grant Type 2 on the BWP;<br>    2> suspend any configured uplink grant of configured grant Type 1 on the inactive BWP.<br>    2> discard explicitly-signalled CFRA Resources for 2-step RA and/or dedicated PUSCH resources for 2-step RA (e.g., dedicated msgA PUSCH resources) configured for the BWP |

In one implementation, the UE may discard explicitly-signalled CFRA resources for 2-step RA type and/or dedicated PUSCH resources for 2-step RA (e.g., dedicated msgA PUSCH resources) of a cell if (or when) the cell is deactivated. The RA procedure may be an RA procedure with 2-step RA type at the initialization. The RA procedure may be requested by RRC upon synchronous reconfiguration (e.g., handover).

In one implementation, if a UE receives an RRCReconfiguration (with reconfigurationWithSync) message from a network node, the UE may initiate an RA procedure with a 2-step RA type if the CFRA resources for 2-step RA and/or the dedicated PUSCH resource for 2-step RA are configured. If (or when) the cell is deactivated, the UE may discard the explicitly-signalled CFRA resources for 2-step RA and/or the dedicated PUSCH resources for 2-step RA (e.g., dedicated msgA PUSCH resources). The RA procedure may be initiated and/or performed on the cell.

In one implementation, the configured SCell(s) may be deactivated due to reception of an SCell Activation/Deactivation MAC CE specified by the 3GPP TS 38.321 V15.7.0.

In one implementation, the configured SCell(s) may be deactivated due to an SCell Deactivation Timer (e.g., sCellDeactivationTimer, which is specified in the 3GPP TS 38.331 V15.7.0). The sCellDeactivationTimer may be configured based on per-configured-SCell basis (except for the SCell(s) configured with a PUCCH, if any). The SCell(s) associated with the sCellDeactivationTimer may be deactivated upon the expiry of the sCellDeactivationTimer.

An example of the corresponding UE operation is in Table 5.

TABLE 5

Example if an SCell Activation/Deactivation MAC CE is received deactivating the SCell; or
    1> if the sCellDeactivationTimer associated with the activated SCell expires:
        2> deactivate the SCell according to the timing defined in TS 38.213;
        2> stop the sCellDeactivationTimer associated with the SCell;
        2> stop the bwp-InactivityTimer associated with the SCell;
        2> deactivate any active BWP associated with the SCell;
        2> clear any configured downlink assignment and any configured uplink grant Type 2
            associated with the SCell respectively;
        2> clear any PUSCH resource for semi-persistent CSI reporting associated with the
            SCell;
        2> discard explicitly-signalled CFRA Resources for 2-step RA and/or dedicated PUSCH
            resources for 2-step RA (e.g., dedicated msgA PUSCH resources) configured for the
            SCell
        2> suspend any configured uplink grant Type 1 associated with the SCell;
        2> flush all HARQ buffers associated with the SCell.

In one implementation, the UE may discard explicitly-signalled CFRA resources for 2-step RA type and/or dedicated PUSCH resources for 2-step RA (e.g., dedicated msgA PUSCH resources) of a BWP (and/or a cell) if (or when) the UE receives a specific indication from a network node (or from the lower layer, e.g., PHY layer).

For example, the specific indication may be used to indicate whether the 2-step CFRA resource and/or the dedicated PUSCH resources for 2-step RA (e.g., dedicated msgA PUSCH resources) is valid or not.

In one implementation, if a UE receives an RRCReconfiguration (with reconfigurationWithSync) message from a network node, the UE may initiate an RA procedure with a 2-step RA type if the CFRA resources for 2-step RA and/or the dedicated PUSCH resource for a 2-step RA are configured. If (or when) the UE receives the specific indication from a network node (or from the lower layer), the UE may discard the explicitly-signalled CFRA resources for 2-step RA and/or the dedicated PUSCH resources for 2-step RA (e.g., dedicated msgA PUSCH resources).

In one implementation, the specific indication may be indicated via RRC signaling (e.g., RRC configuration), MAC signaling (e.g., MAC CE), and/or PHY signaling (e.g., PDCCH and/or DCI).

In one implementation, the specific indication may be indicated by an RAR and/or MSGB.

In one implementation, the specific indication may be received by the UE during the RA procedure with 2-step RA type.

In one implementation, the UE may discard explicitly-signalled CFRA resources for 2-step RA type and/or dedicated PUSCH resources for 2-step RA (e.g., dedicated msgA PUSCH resources) if (or when) a timer expires.

In one implementation, the timer may be used to determine whether the 2-step CFRA resource and/or the dedicated PUSCH resources for 2-step RA (e.g., dedicated msgA PUSCH resources) is valid or not. For example, if the timer is running, the 2-step CFRA resource and/or the dedicated PUSCH resources for 2-step RA (e.g., dedicated msgA PUSCH resources) may be considered as valid. If the timer is not running (or expired), the 2-step CFRA resource and/or the dedicated PUSCH resources for 2-step RA (e.g., dedicated msgA PUSCH resources) may be invalid.

In one implementation, upon expiry of the timer, the UE may not perform CFRA with 2-step RA type.

In one implementation, the timer (and its value, e.g., ms.) may be configured in a handover command (e.g., ReconfigurationWithSync configuration).

In one implementation, the timer may be maintained in the RRC layer and/or the MAC layer.

In one implementation, the timer (and its value) may be configured in an RA configuration for 2-step RA (e.g., RACH-ConfigDedicated, RACH-ConfigCommonTwoStepRA, and/or RACH-ConfigGenericTwoStepRA).

In one implementation, if a UE receives an RRCReconfiguration (with reconfigurationWithSync) message from a network node, the UE may initiate an RA procedure with 2-step RA type if CFRA resources for 2-step RA and/or dedicated PUSCH resource for 2-step RA are configured. The RA procedure may be an RA procedure with 2-step RA type at the initialization. The UE may (re-)start a timer when the RA procedure with 2-step RA is initiated, e.g., when receiving and/or applying an RRCReconfiguration (with reconfigurationWithSync) message from a network node. If (or when) the timer expires or stopped, the UE may discard the explicitly-signalled CFRA resources for 2-step RA and/or the dedicated PUSCH resources for 2-step RA (e.g., dedicated msgA PUSCH resources).

In one implementation, if a UE receives an RRCReconfiguration (with reconfigurationWithSync) message from a network node, the UE may initiate an RA procedure with 2-step RA type if CFRA resources for 2-step RA and/or dedicated PUSCH resource for 2-step RA are configured. The RA procedure may be an RA procedure with 2-step RA type at the initialization. The UE may (re-)start a timer upon reception of an RRCReconfiguration message (including reconfigurationWithSync). If (or when) the timer expires or stopped, the UE may discard the explicitly-signalled CFRA resources for 2-step RA and/or the dedicated PUSCH resources for 2-step RA (e.g., dedicated msgA PUSCH resources).

In one implementation, the timer may be stopped upon successful completion of an RA procedure on the corresponding cell (e.g., SpCell or SCell). In one implementation, the timer may be stopped when an RA procedure on the corresponding cell is unsuccessfully completed. In one implementation, the timer may be stopped if the UE sets the RA type of an RA procedure from a 2-step RA type to a 4-step RA type.

In one implementation, if (or when) the timer expires, the UE may initiate an RRC re-establishment procedure. In one implementation, the UE may inform the network of a reconfiguration with sync (or "handover") failure.

In one implementation, if (or when) the timer expires, the UE may set the RA_TYPE to 4-stepRA.

In one implementation, if a new (CF) RA procedure is triggered (by the network or by the UE itself) while another RA procedure is ongoing and the UE decides to continue the ongoing RA procedure, the UE may discard explicitly-signalled CFRA resources for 2-step RA type and/or dedicated PUSCH resources for 2-step RA (e.g., dedicated MSGA PUSCH resources), where the explicitly-signalled CFRA resources for 2-step RA type and/or the dedicated PUSCH resources for 2-step RA (e.g., dedicated msgA PUSCH resources) may be configured for the new RA procedure. More specifically, the ongoing RA procedure and/or the new RA procedure may be an RA procedure with 2-step RA type at the initialization.

In one implementation, if a UE receives an RRCReconfiguration (with reconfigurationWithSync) message from a network node while the UE is performing an RA procedure, the UE may continue the RA procedure (i.e., the UE may not initiate a new RA procedure), depending on UE implementation. Once the RA procedure is continued, the UE may discard the explicitly-signalled CFRA resources for 2-step RA and/or the dedicated PUSCH resources for 2-step RA (e.g., dedicated msgA PUSCH resources) if the CFRA resources for 2-step RA and/or the dedicated PUSCH resource for 2-step RA are configured via the RRCReconfiguration message.

In one implementation, the CFRA resources for 2-step RA type and/or the dedicated PUSCH resource for 2-step RA may be provided by the network via RRC signaling (e.g., RRC configuration), MAC signaling (e.g., MAC CE), and/or PHY signaling (e.g., PDCCH and/or DCI).

In one implementation, the UE may discard the dedicated PUSCH resources for 2-step RA (e.g., dedicated msgA PUSCH resources) but not discard the explicitly-signalled CFRA resources for 2-step RA type if at least one of the following conditions is satisfied:

the UE considers the RA procedure with 2-step RA type is successfully completed, and the UE sets the RA type of the RA procedure from a 2-step RA type to a 4-step RA type.

The UE may still use the dedicated RA resources for 2-step RA (e.g., preamble and/or PRACH resource) to perform the RA procedure even if the dedicated PUSCH resources for 2-step (e.g., dedicated msgA PUSCH resources) is not available (e.g., in a case that the dedicated PUSCH resource is discarded). For example, the UE may discard the dedicated PUSCH resources for 2-step RA (e.g., dedicated msgA PUSCH resources) but not discard the explicitly-signalled CFRA resources for 2-step RA type if (or when) a TA timer (e.g., timeAlignmentTimer, which is specified in 3GPP TS 38.331 V15.7.0) expires and/or when the UE considers that the TA timer expires.

In one implementation, the conditions to discard the explicitly-signaled CFRA resources for 2-step RA type and/or the dedicated PUSCH resources for 2-step RA (e.g., dedicated msgA PUSCH resources) (e.g., when the UE considers the RA procedure with 2-step RA type successfully completed, when the UE sets the RA type of the RA procedure from a 2-step RA type to a 4-step RA type, etc.) may also be the conditions to discard the explicitly-signalled CFRA resource(s) for 4-step RA type. The methods for 2-step RA may also be applied to 4-step RA. For example, the UE may discard explicitly-signalled 4-step CFRA resources of a BWP if (or when) the BWP is deactivated.

Figure 9:
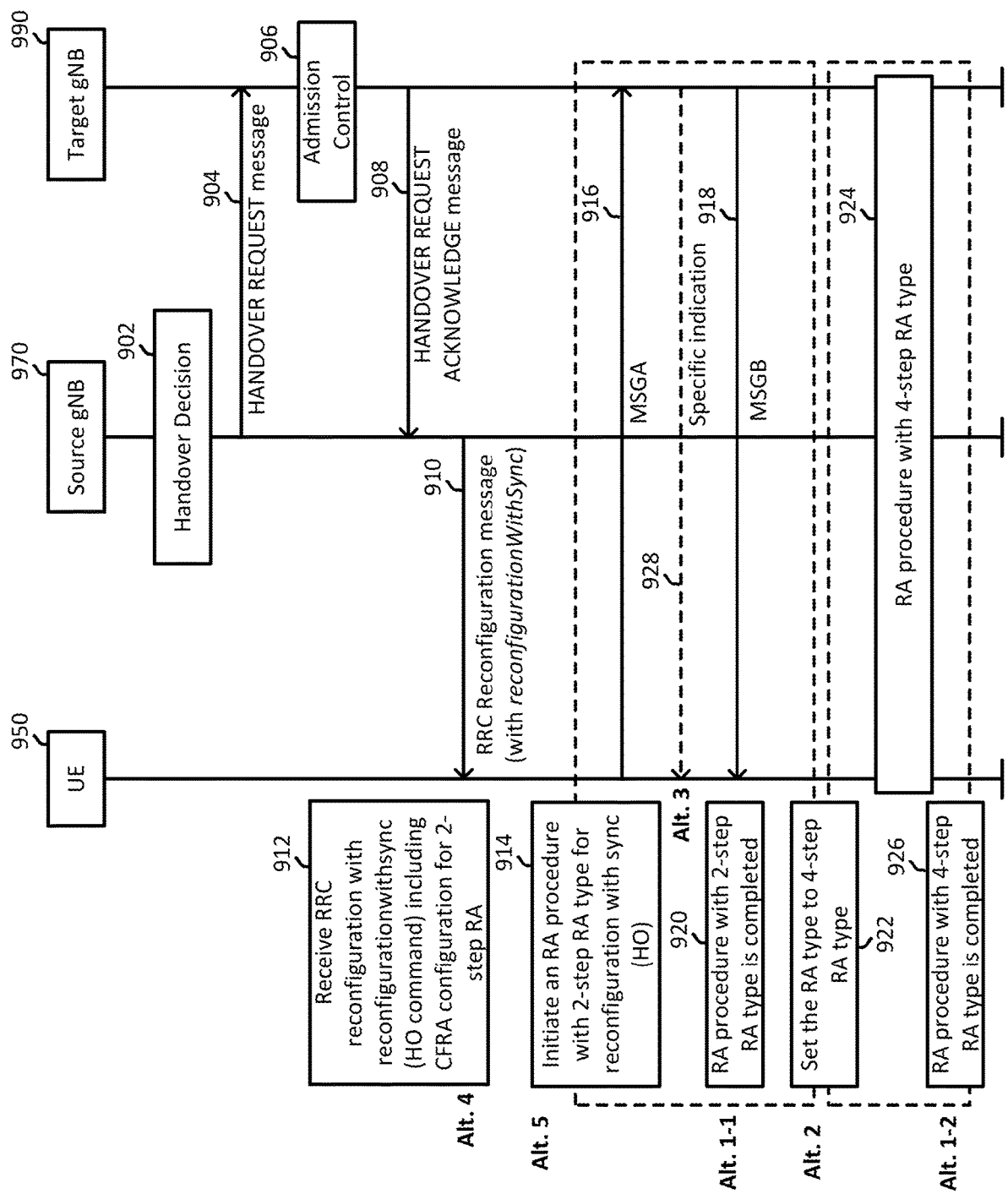
FIG. 9 illustrates the timing of discarding explicitly-signaled CFRA resources for 2-step RA type and/or dedicated Physical Uplink Shared Channel (PUSCH) resources for 2-step RA, in accordance with an implementation of the present disclosure.

FIG. 9 illustrates the timing of discarding explicitly-signaled CFRA resources for 2-step RA type and/or dedicated Physical Uplink Shared Channel (PUSCH) resources for 2-step RA, in accordance with an implementation of the present disclosure. As illustrated in FIG. 9, a UE 950 may discard the explicitly-signalled CFRA resources for 2-step RA type and/or the dedicated PUSCH resources for 2-step RA (e.g., dedicated msgA PUSCH resources) when certain condition(s) is satisfied. The timing when the condition(s) is satisfied is denoted as Alt. 1-1, Alt. 1-2, Alt. 2, Alt. 3, Alt. 4, or Alt. 5 in FIG. 9.

The RA procedure illustrated in FIG. 9 may be triggered/initiated for handover (e.g., when the UE receives an RRCReconfiguration (with reconfigurationWithSync) message from a network node).

As illustrated in FIG. 9, the source gNB 970 may make a handover decision in action 902 and transmit a HANDOVER REQUEST message to the target gNB 990 in action 904. The target gNB 990 may perform admission control in action 906, and transmit a HANDOVER REQUEST ACKNOWLEDGE message to the source gNB 970 in action 908. Once the source gNB 970 receives the HANDOVER REQUEST ACKNOWLEDGE message, the source gNB 970 may extract or obtain the information required for the UE 950 to access the target gNB 990 from the HANDOVER REQUEST ACKNOWLEDGE message, and transmit the information to the UE 950 via an RRC Reconfiguration message (with a specific parameter reconfigurationWithSync) in action 910. The RRC Reconfiguration message with reconfigurationWithSync may be considered as a HO (handover) command.

In action 912, the UE may determine that the RRC Reconfiguration message with reconfigurationWithSync (HO command) includes a CFRA configuration for 2-step RA.

In action 914, the UE may initiate an RA procedure with 2-step RA type, e.g., for reconfiguration with sync (or for handover).

During the RA procedure with 2-step RA type, the UE may transmit a MSGA to the target gNB 990 in action 916 and receive a MSGB from the target gNB 990 in action 918.

Once the MSGB is received, the UE 950 may consider that the RA procedure is successfully completed in action 920.

If the number of failures of the RA procedure with 2-step RA type and/or if the number of MSGA preamble transmissions reaches to a predetermined number (e.g., via msgA-TransMax), the UE 950 may set the RA type of the RA procedure to a 4-step RA type in action 922.

In action 924, an RA procedure with 4-step RA type is performed.

In action 926, the UE 950 may consider that the RA procedure is successfully completed, e.g., if a contention resolution process (based on MSG4) is considered successful.

In one implementation, the UE 950 may receive a specific indication from the target gNB 990 after the MSGA is transmitted in action 928. The specific indication may be used to indicate whether the CFRA resources for 2-step RA type and/or the dedicated PUSCH resources for 2-step RA (e.g., dedicated msgA PUSCH resources) is valid or not. In one implementation, the specific indication may be indicated via RRC signaling (e.g., RRC configuration), MAC signaling (e.g., MAC CE), and/or PHY signaling (e.g., PDCCH and/or DCI). In one implementation, the specific indication may be indicated by an RAR and/or MSGB.

The UE may discard the explicitly-signaled CFRA resources for 2-step RA type and/or the dedicated PUSCH resources for 2-step RA (e.g., dedicated msgA PUSCH resources) at the timing of at least one of Alt. 1-1, Alt. 1-2, Alt. 2, Alt. 3, Alt. 4, or Alt. 5. The CFRA resources for 2-step RA type may include MSGA preamble(s) and/or PRACH resource(s) for 2-step RA. The dedicated PUSCH resources for 2-step RA (e.g., dedicated msgA PUSCH resources) may be a PUSCH occasion for 2-step RA which may be configured as the time-frequency resource for payload transmission. As described previously, the CFRA resources for 2-step RA type (e.g., occasionsTwoStepRA) and/or dedicated PUSCH resource (e.g., msgA-CFRA-PUSCH) may be included in an RRC reconfiguration message including a reconfiguration with synchronization information (e.g., RRCReconfiguration with reconfigurationWithSync) and/or be included in a dedicated RACH configuration (e.g., RACH-ConfigDedicated) for 2-step RA (e.g., cfra-Twostep).

Moreover, the terms "discard," "release," "clear," and "flush" may be interchangeably used in some implementations of the present disclosure.

In Alt. 1-1, the UE may discard explicitly-signalled CFRA resources for 2-step RA type and/or dedicated PUSCH resources for 2-step RA (e.g., dedicated msgA PUSCH resources) when the UE considers the RA procedure (with 2-step RA type) is successfully completed (e.g., in action 920).

In Alt. 1-2, the UE may discard explicitly-signalled CFRA resources for 2-step RA type and/or dedicated PUSCH resources for 2-step RA (e.g., dedicated msgA PUSCH resources) when the UE considers the RA procedure (with 4-step RA type) is successfully completed (e.g., in action 926).

In Alt. 2, the UE may discard explicitly-signalled CFRA resources for 2-step RA type and/or dedicated PUSCH resources for 2-step RA (e.g., dedicated msgA PUSCH resources) when the UE sets the RA type of the RA procedure from the 2-step RA type to the 4-step RA type (e.g., in action 922).

In Alt. 3, the UE may discard explicitly-signalled CFRA resources for 2-step RA type and/or dedicated PUSCH resources for 2-step RA (e.g., dedicated msgA PUSCH resources) when the UE receives a specific indication from the network (e.g., from the target gNB 990) (e.g., in action 928).

In Alt. 4, the UE may discard explicitly-signalled CFRA resources for 2-step RA type and/or dedicated PUSCH resources for 2-step RA (e.g., dedicated msgA PUSCH resources) when a Timer T1 expires, where the Timer T1 may be (re-)started when the UE receives RRCReconfiguration with reconfigurationWithSync (HO command) (e.g., in action 912).

In Alt. 5, the UE may discard explicitly-signalled CFRA resources for 2-step RA type and/or dedicated PUSCH resources for 2-step RA (e.g., dedicated msgA PUSCH resources) when a Timer T2 expires, where the Timer T2 may be (re-)started when the UE initiates an RA procedure (e.g., in action 914).

The present disclosure provides communication method(s) for RA operations. The communication method(s) is more flexible and better fits the requirements of different 5G scenarios (e.g., RA procedure with 2-step RA type and 4-step RA type) than LTE.

Figure 10:
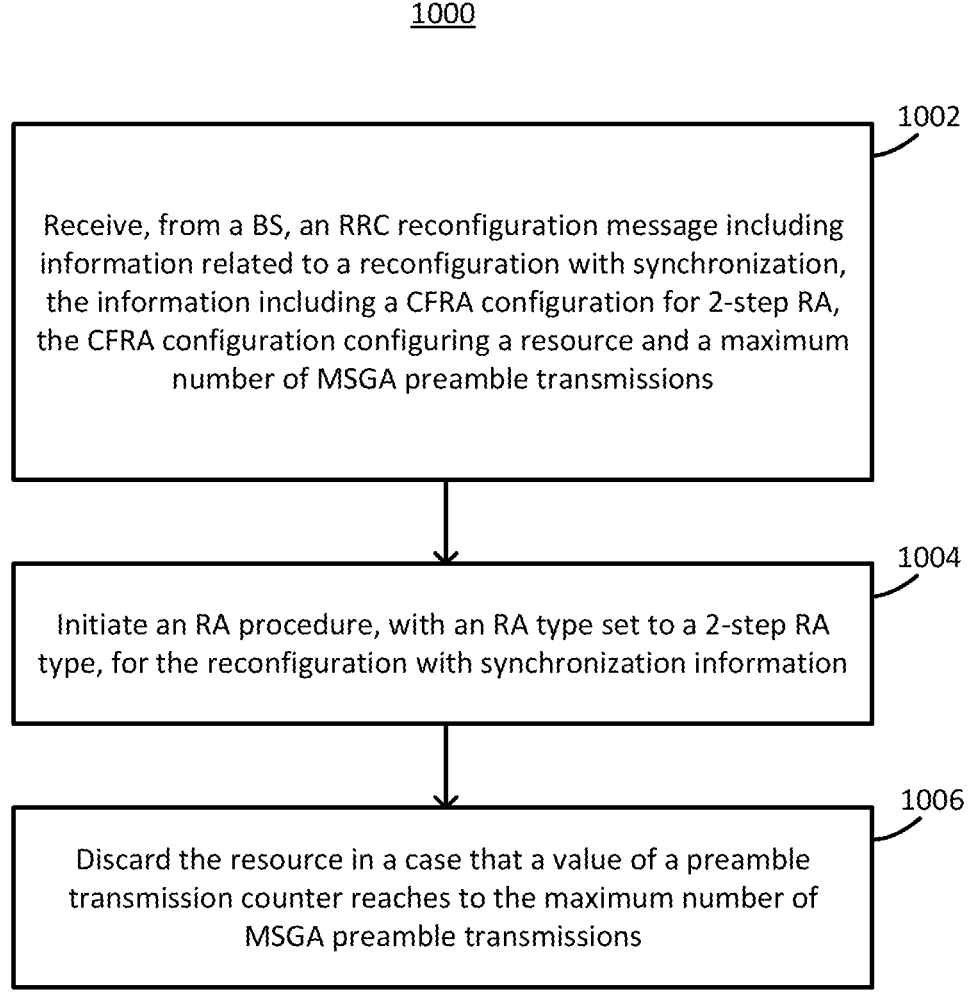
FIG. 10 illustrates a flowchart for a communication method for RA operations, in accordance with an implementation of the present disclosure.

FIG. 10 illustrates a flowchart for a communication method 1000 for RA operations, in accordance with an implementation of the present disclosure. The communication method 1000 may be performed by a UE. Although actions 1002, 1004, and 1006 are delineated as separate actions represented as independent blocks in FIG. 10, these separately delineated actions should not be construed as necessarily order dependent. The order in which the actions are performed in FIG. 10 is not intended to be construed as a limitation, and any number of the disclosed blocks may be combined in any order to implement the method, or an alternate method. Moreover, one or more of the actions 1002, 1004, and 1006 may be omitted in some of the present disclosure.

In action 1002, the UE may receive, from a BS, an RRC reconfiguration message including information related to a reconfiguration with synchronization. The information related to the reconfiguration with synchronization may be (or correspond to) the IE reconfigurationWithSync. The RRC reconfiguration message with/including the information related to the reconfiguration with synchronization may be (or correspond to) the IE "RRCReconfiguration with reconfigurationWithSync." The RRC reconfiguration message (i.e., RRCReconfiguration with reconfigurationWithSync) may be a HO (handover) command from the BS. The information related to the reconfiguration with synchronization (reconfigurationWithSync) may include a CFRA configuration for 2-step RA that configures a resource and a maximum number of MSGA preamble transmissions.

In action 1004, the UE may initiate an RA procedure, with an RA type set to a 2-step RA type, for (the purpose of) the reconfiguration with synchronization. In other words, the UE may initiate an RA procedure with 2-step RA type for handover.

In action 1006, the UE may discard the resource (configured by the CFRA configuration for 2-step RA) in a case that a value of a preamble transmission counter reaches to the maximum number of MSGA preamble transmissions.

In one implementation, the resource may include at least one of a PUSCH resource and a CFRA resource for 2-step RA.

In one implementation, the resource (configured by the CFRA configuration for 2-step RA) may be a dedicated resource for the UE.

In one implementation, the maximum number of MSGA preamble transmissions may be indicated by an IE denoted as msgA-TransMax in the CFRA configuration for 2-step RA.

Figure 11:
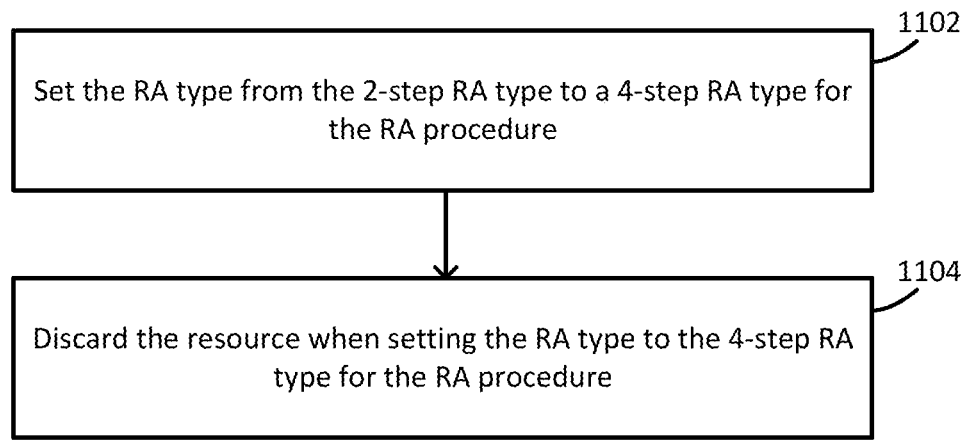
FIG. 11 illustrates a flowchart for a communication method for RA operations, in accordance with an implementation of the present disclosure.

FIG. 11 illustrates a flowchart for a communication method 1100 for RA operations, in accordance with an implementation of the present disclosure. The communication method 1100 may be performed in combination with the communication method 1000 in FIG. 10. For example, the communication method 1100 may be performed after action 1004 of the communication method 1000.

In action 1102, the UE may set the RA type from the 2-step RA type to a 4-step RA type for the RA procedure. For example, the RA type of the RA procedure may be set/switched from the 2-step RA type to the 4-step RA type.

In action 1104, the UE may discard the resource (configured by the CFRA configuration for 2-step RA) when setting the RA type to the 4-step RA type for the RA procedure.

Figure 12:
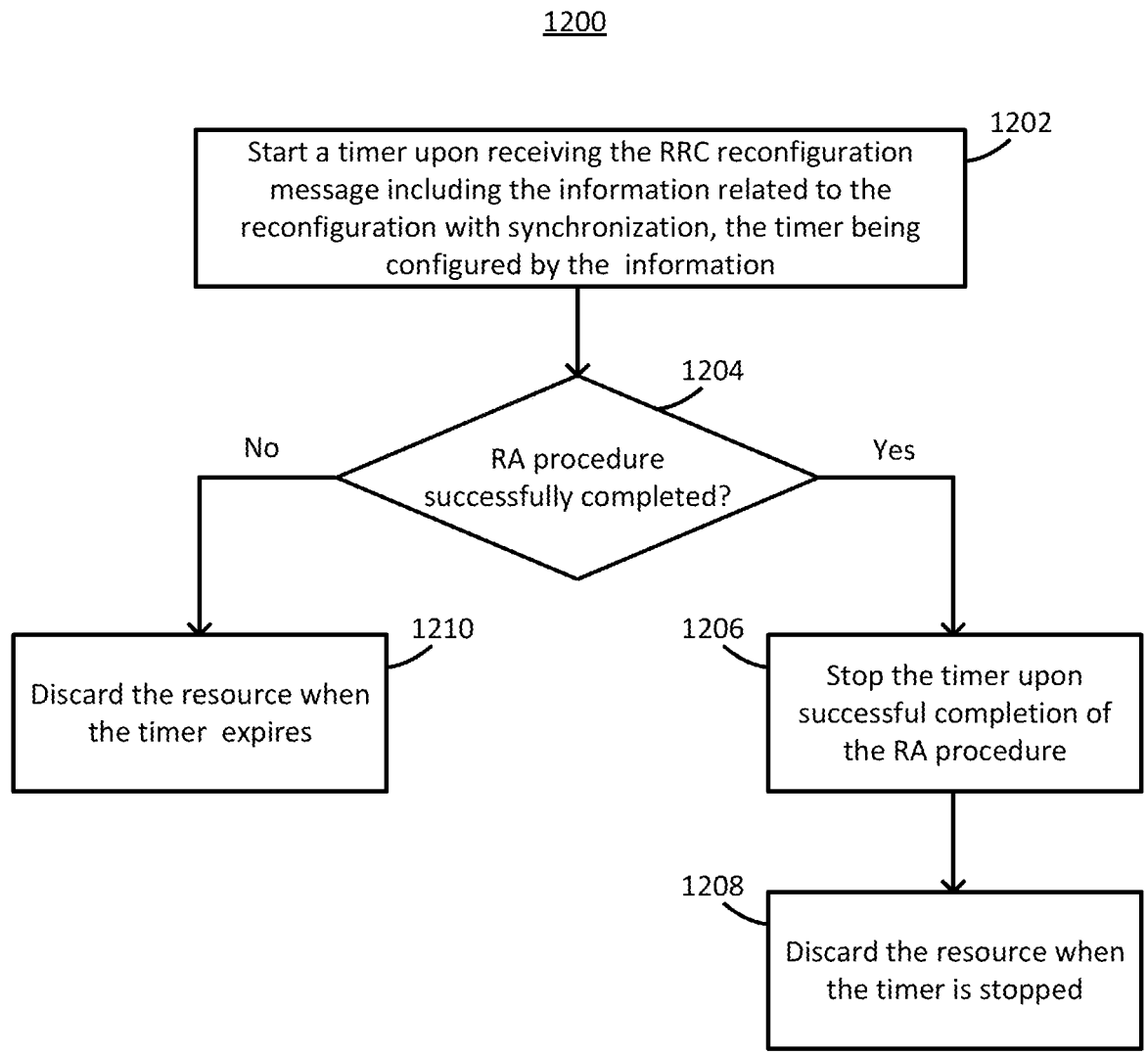
FIG. 12 illustrates a flowchart for a communication method for RA operations, in accordance with an implementation of the present disclosure.

FIG. 12 illustrates a flowchart for a communication method 1200 for RA operations, in accordance with an implementation of the present disclosure. The communication method 1200 may be performed in combination with any of the communication method 1000 in FIG. 10 and the communication method 1100 in FIG. 11.

In action 1202, the UE may start a timer upon receiving the RRC reconfiguration message including/with the information related to the reconfiguration with synchronization (RRCReconfiguration with reconfigurationWithSync), where the timer may be configured by the information (reconfigurationWithSync).

In action 1204, the UE may determine whether the RA procedure is successfully completed.

In actions 1206 and 1208, if the RA procedure is successfully completed, the UE may stop the timer upon successful completion of the RA procedure and discard the resource when the timer is stopped.

In action 1210, if the RA procedure is not successfully completed, the UE may discard the resource when the timer expires. Different from stopping a timer, the expiry of a timer may mean that the timer is run out. A timer may be stopped before the timer expires.

Figure 13:
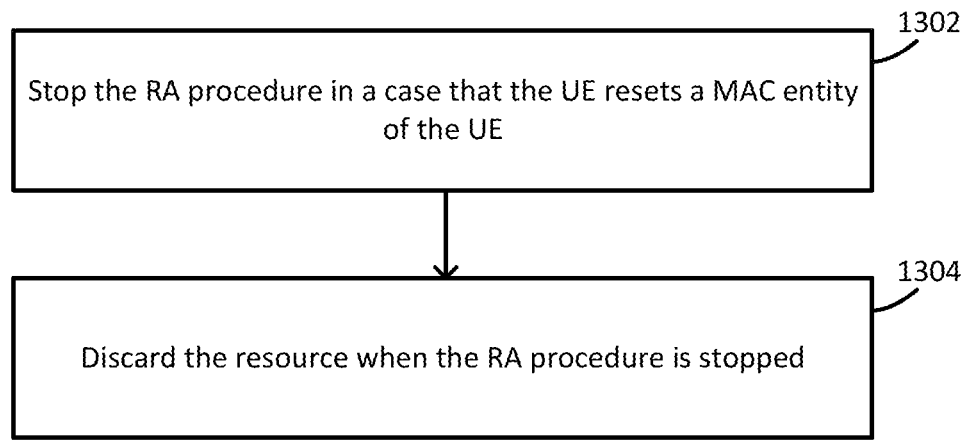
FIG. 13 illustrates a flowchart for a communication method for RA operations, in accordance with an implementation of the present disclosure.

FIG. 13 illustrates a flowchart for a communication method 1300 for RA operations, in accordance with an implementation of the present disclosure. The communication method 1300 may be performed in combination with any of the communication methods 1000, 1100 and 1200. For example, the communication method 1300 may be performed after action 1004 of the communication methods 1000.

In action 1302, the UE may stop the RA procedure in a case that the UE resets a MAC entity of the UE.

In action 1304, the UE may discard the resource when the RA procedure is stopped.

Figure 14:
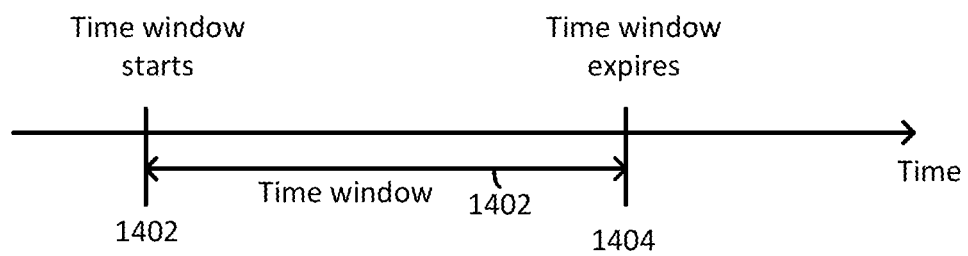
FIG. 14 illustrates a time window for a UE to monitor a network response from a B S, in accordance with an implementation of the present disclosure.

FIG. 14 illustrates a time window 1402 for a UE to monitor a network response from a BS, according to an implementation of the present disclosure. The network response may be an RAR and/or a MSGB for an RA procedure with the 2-step RA type. The time window may be a ra-Response Window and/or a MSGB-ResponseWindow.

As illustrated in FIG. 14, the UE may start the time window 1402 upon transmission of an RA preamble and/or MSGA preamble and monitor the corresponding RAR for 2-step RA type and/or MSGB during the time window 1402. If the UE receives an RAR for 2-step RA type and/or MSGB during the time window 1402, the time window 1402 may be stopped. Otherwise, the UE may increment the value of a preamble transmission counter (e.g., PREAMBLE_TRANSMISSION_COUNTER) when the time window 1402 expires. For example, the value of the preamble transmission counter may be increased by one if the UE does not receive any RAR for 2-step RA type and/or MSGB from the BS before the time window 1402 expires. The value of the preamble transmission counter may be reset (e.g., set to a default initial value) when the RA procedure is initiated.

The following may be used to further disclose terms, examples, embodiments, actions, and/or behaviours:

User Equipment (UE): The UE may be referred to PHY/MAC/RLC/PDCP/SDAP entity. The PHY/MAC/RLC/PDCP/SDAP entity may be referred to the UE.

Network (NW): The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For Dual Connectivity operation the term Special Cell refers to the PCell of the MCG or the PSCell of the SCG depending on if the MAC entity is associated to the MCG or the SCG, respectively. Otherwise, the term Special Cell refers to the PCell. A Special Cell supports PUCCH transmission and contention-based Random Access, and is always activated.

CC (Component Carrier): The CC may be PCell, PSCell, and/or SCell.

Additionally, a UE may perform an RA procedure (with 2-step and/or 4-step RA types) based on the following:
RA Procedure
RA Procedure Initialization
An example of UE behavior for RA procedure initialization is in Table 6.

TABLE 6

The RA procedure may be is initiated by a PDCCH order, by the MAC entity itself, or by RRC for the events in accordance with TS 38.300. There is only one RA procedure ongoing at
any point in time in a MAC entity. The RA procedure on an SCell shall only be initiated by a PDCCH order with ra-PreambleIndex different from 0b000000.
  If a new RA procedure is triggered while another is already ongoing in the MAC entity, it is
    up to UE implementation whether to continue with the ongoing procedure or start
    with the new procedure (e.g., for SI request).
    RRC configures the following parameters for the RA procedure:
- prach-ConfigurationIndex: the available set of PRACH occasions for the
  transmission of
  the Random Access Preamble;
- msgA-prach-ConfigurationIndex: the available set of PRACH occasions for the
  transmission of the Random Access Preamble for MSGA in 2-step random access;
- msgA-prach-ConfigurationIndexNew: Cell-specific additional PRACH configuration
  index for 2-step random access;

TABLE 6-continued

- preambleReceivedTargetPower: initial Random Access Preamble power;
- rsrp-ThresholdSSB: an RSRP threshold for the selection of the SSB. If the RA procedure
  is initiated for beam failure recovery, rsrp-ThresholdSSB used for the selection of the
  SSB within candidateBeamRSList refers to rsrp-ThresholdSSB in
  BeamFailureRecoveryConfig IE;
- rsrp-ThresholdCSI-RS: an RSRP threshold for the selection of CSI-RS. If the RA
  procedure is initiated for beam failure recovery, rsrp-ThresholdCSI-RS is equal to rsrp-
  ThresholdSSB in BeamFailureRecoveryConfig IE;
- rsrp-ThresholdSSB-SUL: an RSRP threshold for the selection between the NUL carrier
  and the SUL carrier;
- rsrp-Threshold-msgA: an RSRP threshold for selection of 2-step random access
- msgATransMax: The maximum number of MSGA transmissions after which, the UE
  sets to MSG1 transmission;
- candidateBeamRSList: a list of reference signals (CSI-RS and/or SSB) identifying the
  candidate beams for recovery and the associated Random Access parameters;
- recoverySearchSpaceId: the search space identity for monitoring the response of the
  beam failure recovery request;
- powerRampingStep: the power-ramping factor;
- msgApreamble-powerRampingStep: Power ramping step for MSGA preamble;
- powerRampingStepHighPriority: the power-ramping factor in case of prioritized RA
  procedure;
- msgApreamble-powerRampingStepHighPriority: the power-ramping factor in case of
  prioritized RA procedure with 2-step RA type;
- scalingFactorBI: a scaling factor for prioritized RA procedure;
- scalingFactorBIMsgA: a scaling factor for prioritized RA procedure with 2-step RA
  type;
- ra-PreambleIndex: Random Access Preamble;
- ra-ssb-OccasionMaskIndex: defines PRACH occasion(s) associated with an SSB in
  which the MAC entity may transmit a Random Access Preamble;
- msgA-ssb-sharedROmaskindex: Indicates the subset of 4-step random access
  ROs shared
  with 2-step random access ROs, if not configured then all 4-step random access
  ROs are
  available for 2-step random access;
- ra-OccasionList: defines PRACH occasion(s) associated with a CSI-RS in which the
  MAC entity may transmit a Random Access Preamble;
- ra-PreambleStartIndex: the starting index of Random Access Preamble(s) for on-
  demand SI request;
- preambleTransMax: the maximum number of Random Access Preamble transmission;
- ssb-perPACH-OccasionAndCB-PreamblesPerSSB: defines the number of
  SSBs mapped
  to each PRACH occasion and the number of contention-based Random Access
  Preambles mapped to each SSB;
- ssb-perRACH-OccasionAndCB-PreamblesPerSSB-msgA: Configuration of the number
  of SSBs per RO, and number of contention-based preambles for each SSB for 2-step
  random access;
- if groupBconfigured is configured, then Random Access Preambles group B is
  configured.
  - Amongst the contention-based Random Access Preambles associated
    with an SSB (as
    defined in TS 38.213), the first numberOfRA-PreamblesGroupA Random Access
    Preambles belong to Random Access Preambles group A. The remaining Random
    Access Preambles associated with the SSB belong to Random Access Preambles
    group B (if configured).
If Random Access Preambles group B is supported by the cell Random Access Preambles
    group B is included for each SSB.
- if Random Access Preambles group B is configured:
  - ra-Msg3SizeGroupA: the threshold to determine the groups of Random Access
    Preambles;
  - ra-MsgASizeGroupA: the threshold to determine the groups of Random Access
    Preambles for 2-step random access;
  - msg3-DeltaPreamble: $\Delta_{PREAMBLE\_Msg3}$ in TS 38.213;
  - msgADeltaPreamble: $\Delta_{PREAMBLE\_MsgA}$ in TS 38.213;
  - messagePowerOffsetGroupB: the power offset for preamble selection;
  - numberOfRA-PreamblesGroupA: defines the number of Random Access Preambles
    in Random Access Preamble group A for each SSB.
- the set of Random Access Preambles and/or PRACH occasions for SI request, if any;
- the set of Random Access Preambles and/or PRACH occasions for beam failure
  recovery request, if any;
- the set of Random Access Preambles and/or PRACH occasions for
  reconfiguration with
  sync, if any;

TABLE 6-continued

- ra-ResponseWindow: the time window to monitor RA response(s) (SpCell only);
- ra-ContentionResolutionTimer: the Contention Resolution Timer (SpCell only);
- msgB-ResponseWindow: the time window to monitor RA response(s) for
  2-step random
  access (SpCell only).

In addition, the following information for related Serving Cell is assumed to be available for UEs:
- if Random Access Preambles group B is configured:
  - if the Serving Cell for the RA procedure is configured with supplementary uplink as specified in TS 38.331, and SUL carrier is selected for performing RA procedure:
    - $P_{CMAX,f,c}$ of the SUL carrier as specified in TS 38.101-1, TS 38.101-2, and TS 38.101-3.
  - else:
    - $P_{CMAX,f,c}$ of the NUL carrier as specified in TS 38.101-1, TS 38.101-2, and TS 38.101-3.

The following UE variables are used for the RA procedure:
- PREAMBLE_INDEX;
- PREAMBLE_TRANSMISSION_COUNTER;
- PREAMBLE_POWER_RAMPING_COUNTER;
- PREAMBLE_POWER_RAMPING_STEP;
- PREAMBLE_RECEIVED_TARGET_POWER;
- PREAMBLE_BACKOFF;
- PCMAX;
- SCALING_FACTOR_BI;
- TEMPORARY_C-RNTI;
- RA_TYPE;
- POW_OFFSET_2STEP_RA.

When the RA procedure is initiated on a Serving Cell, the MAC entity shall:
1> flush the MSG3 buffer;
1> flush the MSGA buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> set POW_OFFSET_2STEP_RA to 0;
1> if the carrier to use for the RA procedure is explicitly-signalled:
  2> select the signalled carrier for performing RA procedure;
  2> set the PCMAX to $P_{CMAX,f,c}$ of the signalled carrier.
1> else if the carrier to use for the RA procedure is not explicitly-signalled; and
1> if the Serving Cell for the RA procedure is configured with supplementary uplink as specified in TS 38.331; and
1> if the RSRP of the downlink pathloss reference is less than rsrp-ThresholdSSB-SUL:
  2> select the SUL carrier for performing RA procedure;
  2> set the PCMAX to $P_{CMAX,f,c}$ of the SUL carrier.
1> else:
  2> select the NUL carrier for performing RA procedure;
  2> set the PCMAX to $P_{CMAX,f,c}$ of the NUL carrier.
1> perform the BWP operation;
1> if RA procedure is initiated by PDCCH order and if the ra-PreambleIndex explicitly provided by PDCCH is not 0b000000; or
1> if the RA procedure was initiated for SI request (as specified in TS 38.331) and the Random Access Resources for SI request have been explicitly provided by RRC; or
1> if contention-free Random Access resources for 4-step random access are configured:
  2> set the RA_TYPE to 4-stepRA;
1> else if the rsrp-Threshold-msgA is configured and the RSRP of the downlink pathloss reference is above the configured rsrp-Threshold-msgA; or
1> if the BWP selected for RA procedure is only configured with 2-step random access resources (e.g., no 4-step RACH resources configured); or
1> if contention-free Random Access resources for 2-step random access are configured:
  2> set the RA_TYPE to 2-stepRA;

TABLE 6-continued

1> else:
　　2> set the RA_TYPE to 4-stepRA;
1> perform initialization of variables specific to random access type;
1> if RA_TYPE is set to 2-stepRA:
　　2> perform the random access resource selection procedure for 2-step random access;
1> else:
　　2> perform the Random Access Resource selection procedure.

Initialization of Variables Specific to Random Access Type

An example of UE behavior for initialization of variables specific to Random Access type is in Table 7.

TABLE 7

The MAC entity shall:
　1> if RA_TYPE is set to 2-stepRA:
　　2> set PREAMBLE_POWER_RAMPING_STEP to msgApreamble-powerRampingStep;
　　2> set SCALING_FACTOR_BI to 1;
　　2> if the RA procedure was initiated for beam failure recovery; and
　　2> if beamFailureRecoveryConfig is configured for the active UL BWP of the selected
　　　　carrier:
　　　　3> if msgApreamble-powerRampingStepHighPriority is configured in the
　　　　　　beamFailureRecoveryConfig:
　　　　　　4> set PREAMBLE_POWER_RAMPING_STEP to the msgApreamble-
　　　　　　　　powerRampingStepHighPriority.
　　　　3> if scalingFactorBIMsgAis configured in the beamFailureRecoveryConfig:
　　　　　　4> set SCALING_FACTOR_BI to the scalingFactorBIMsgA.
　　2> else if the RA procedure was initiated for handover; and
　　2> if rach-ConfigDedicated is configured for the selected carrier:
　　　　3> if msgApreamble-powerRampingStepHighPriority is configured in the rach-
　　　　　　ConfigDedicated:
　　　　　　4> set PREAMBLE_POWER_RAMPING_STEP to the msgApreamble-
　　　　　　　　powerRampingStepHighPriority.
　　　　3> if scalingFactorBIMsgAis configured in the rach-ConfigDedicated:
　　　　　　4> set SCALING_FACTOR_BI to the scalingFactorBIMsgA.
　1> else: (e.g., RA_TYPE is set to 4-stepRA)
　　2> set PREAMBLE_POWER_RAMPING_STEP to powerRampingStep;
　　2> set SCALING_FACTOR_BI to 1;
　　2> if the RA procedure was initiated for beam failure recovery; and
　　2> if beamFailureRecoveryConfig is configured for the active UL BWP of the selected
　　　　carrier:
　　　　3> start the beamFailureRecoveryTimer, if configured;
　　　　3> apply the parameters powerRampingStep, preambleReceivedTargetPower, and
　　　　　　preambleTransMax configured in the beamFailureRecoveryConfig;
　　　　3> if powerRampingStepHighPriority is configured in the
　　　　　　beamFailureRecoveryConfig:
　　　　　　4> set PREAMBLE_POWER_RAMPING_STEP to the
　　　　　　　　powerRampingStepHighPriority.
　　　　3> if scalingFactorBI is configured in the beamFailureRecoveryConfig:
　　　　　　4> set SCALING_FACTOR_BI to the scalingFactorBI.
　　2> else if the RA procedure was initiated for handover; and
　　2> if rach-ConfigDedicated is configured for the selected carrier:
　　　　3> if powerRampingStepHighPriority is configured in the rach-ConfigDedicated:
　　　　　　4> set PREAMBLE_POWER_RAMPING_STEP to the
　　　　　　　　powerRampingStepHighPriority.
　　　　3> if scalingFactorBI is configured in the rach-ConfigDedicated:
　　　　　　4> set SCALING_FACTOR_BI to the scalingFactorBI.

Random Access Resource Selection

An example of UE behavior for Random Access Resource selection is in Table 8.

TABLE 8

The MAC entity shall:
　1> if the RA procedure was initiated for beam failure recovery; and
　1> if the beamFailureRecoveryTimer is either running or not configured; and
　1> if the contention-free Random Access Resources for beam failure recovery request
　　　associated with any of the SSBs and/or CSI-RSs have been explicitly provided by RRC;
　　　and
　1> if at least one of the SSBs with SS-RSRP above rsrp-ThresholdSSB amongst the SSBs in
　　　candidateBeamRSList or the CSI-RSs with CSI-RSRP above rsrp-ThresholdCSI-RS
　　　amongst the CSI-RSs in candidateBeamRSList is available:

TABLE 8-continued

2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
    2> if CSI-RS is selected, and there is no ra-PreambleIndex associated with the selected CSI-RS:
        3> set the PREAMBLE_INDEX to a ra-PreambleIndex corresponding to the SSB in candidateBeamRSList which is quasi-co-located with the selected CSI-RS as specified in TS 38.214.
    2> else:
        3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
    2> set the PREAMBLE_INDEX to the signalled ra-PreambleIndex;
    2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
    2> select an SSB with SS-RSRP above rsrp-ThresholdSSB amongst the associated SSBs;
    2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
    2> select a CSI-RS with CSI-RSRP above rsrp-ThresholdCSI-RS amongst the associated CSI-RSs;
    2> set the PREAMBLE_INDEX to a ra-PreambleIndex corresponding to the selected CSI-RS.
1> else if the RA procedure was initiated for SI request (as specified in TS 38.331); and
1> if the Random Access Resources for SI request have been explicitly provided by RRC:
    2> if at least one of the SSBs with SS-RSRP above rsrp-ThresholdSSB is available:
        3> select an SSB with SS-RSRP above rsrp-ThresholdSSB.
    2> else:
        3> select any SSB.
    2> select a Random Access Preamble corresponding to the selected SSB, from the Random Access Preamble(s) determined according to ra-PreambleStartIndex as specified in TS 38.331;
    2> set the PREAMBLE_INDEX to selected Random Access Preamble.
1> else (e.g., for the contention-based Random Access preamble selection):
    2> if at least one of the SSBs with SS-RSRP above rsrp-ThresholdSSB is available:
        3> select an SSB with SS-RSRP above rsrp-ThresholdSSB.
    2> else:
        3> select any SSB.
    2> if MSG3 buffer is not empty:
        3> if Random Access Preambles group B is configured:
            4> if the potential MSG3 size (UL data available for transmission plus MAC header and, where required, MAC CEs) is greater than ra-Msg3SizeGroupA and the pathloss is less than PCMAX (of the Serving Cell performing the RA procedure) – preambleReceivedTargetPower – msg3-DeltaPreamble – messagePowerOffsetGroupB; or
            4> if the RA procedure was initiated for the CCCH logical channel and the CCCH SDU size plus MAC subheader is greater than ra-Msg3SizeGroupA:
                5> select the Random Access Preambles group B.
            4> else:
                5> select the Random Access Preambles group A.
        3> else:
            4> select the Random Access Preambles group A.
    2> else (e.g., MSG3 is being retransmitted):
        3> select the same group of Random Access Preambles as was used for the Random Access Preamble transmission attempt corresponding to the first transmission of MSG3.
    2> select a Random Access Preamble randomly with equal probability from the Random Access Preambles associated with the selected SSB and the selected Random Access Preambles group.
    2> set the PREAMBLE_INDEX to the selected Random Access Preamble.
1> if the RA procedure was initiated for SI request (as specified in TS 38.331); and
1> if ra-AssociationPeriodIndex and si-RequestPeriod are configured:
    2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to TS 38.213corresponding to the selected SSB).

TABLE 8-continued

1> else if an SSB is selected above:
    2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to TS 38.213, corresponding to the selected SSB; the MAC entity may take into account the possible occurrence of measurement gaps when determining the next available PRACH occasion corresponding to the selected SSB).
1> else if a CSI-RS is selected above:
    2> if there is no contention-free Random Access Resource associated with the selected CSI-RS:
        3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 (the MAC entity shall select a PRACH occasion randomly with equal probability amongst the consecutive PRACH occasions according to TS 38.213, corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
    2> else:
        3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure.
When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

Random Access Resource Selection for 2-Step Random Access

An example of UE behavior for Random Access Resource selection for 2-step random access is in Table 9.

TABLE 9

The MAC entity shall:
1> if the contention-free 2-step Random Access Resources associated with SSBs have been explicitly provided in rach-ConfigDedicated and at least one SSB with SS-RSRP above rsrp-ThresholdSSB amongst the associated SSBs is available:
    2> select an SSB with SS-RSRP above rsrp-ThresholdSSB amongst the associated SSBs;
    2> set the PREAMBLE_INDEX to a ra-PreambleIndex corresponding to the selected SSB.
1> else if the contention-free 2-step Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
    2> select a CSI-RS with CSI-RSRP above rsrp-ThresholdCSI-RS amongst the associated CSI-RSs;
    2> set the PREAMBLE_INDEX to a ra-PreambleIndex corresponding to the selected CSI-RS.
1> else (e.g., for the contention-based Random Access Preamble selection):
    2> if at least one of the SSBs with SS-RSRP above rsrp-ThresholdSSB is available:
        3> select an SSB with SS-RSRP above rsrp-ThresholdSSB.
    2> else:
        3> select any SSB.
    2> if MSGA has not yet been transmitted:
        3> if Random Access Preambles group B for 2-step RA is configured:
            4> if the potential MSGA payload size (UL data available for transmission plus MAC header and, where required, MAC CEs) is greater than the transport block size of the MSGA payload associated with preamble group A and the nominal required PUSCH power for MSGA determined according to TS 38.213 is less than PCMAX (of the Serving Cell performing the RA procedure); or
            4> if the RA procedure was initiated for the CCCH logical channel and the CCCH SDU size plus MAC subheader is greater than the transport block size of the MSGA payload associated with preamble group A:
                5> select the Random Access Preambles group B.
            4> else:
                5> select the Random Access Preambles group A.

TABLE 9-continued

3> else:
    4> select the Random Access Preambles group A.
  2> else (e.g., MSGA is being retransmitted):
    3> select the same group of Random Access Preambles as was used for the Random Access Preamble transmission attempt corresponding to the first transmission of MSGA.
  2> select a Random Access Preamble randomly with equal probability from the 2-step Random Access Preambles associated with the selected SSB and the selected Random Access Preambles group;
  2> set the PREAMBLE_INDEX to the selected Random Access Preamble;
1> determine the next available PRACH occasion from the PRACH occasions corresponding to the selected SSB (the MAC entity shall select a PRACH occasion randomly with equal probability among the consecutive PRACH occasions allocated for 2-step random access according to TS 38.213, corresponding to the selected SSB; the MAC entity may take into account the possible occurrence of measurement gaps when determining the next available PRACH occasion corresponding to the selected SSB);
1> determine the UL grant and the associated HARQ information for the PUSCH resource of MSGA associated with the selected preamble and PRACH occasion according to TS 38.213;
1> deliver the UL grant and the associated HARQ information to the HARQ entity;
1> perform the MSGA transmission procedure.
To determine if there is an SSB with SS-RSRP above rsrp-ThresholdSSB, the UE uses the latest unfiltered L1-RSRP measurement.

Random Access Preamble Transmission

An example of UE behavior for Random Access Preamble transmission is in Table 10.

TABLE 10

The MAC entity shall, for each Random Access Preamble:
1> if PREAMBLE_TRANSMISSION_COUNTER is greater than one; and
1> if the notification of suspending power ramping counter has not been received from lower layers; and
1> if SSB or CSI-RS selected is not changed from the selection in the last Random Access Preamble transmission:
  2> increment PREAMBLE_POWER_RAMPING_COUNTER by 1.
1> select the value of DELTA_PREAMBLE;
1> set PREAMBLE_RECEIVED_TARGET_POWER topreambleReceivedTargetPower + DELTA_PREAMBLE + (PREAMBLE_POWER_RAMPING_COUNTER − 1) × PREAMBLE_POWER_RAMPING_STEP + POW_OFFSET_2STEP_RA;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX and PREAMBLE_RECEIVED_TARGET_POWER.
    The RA-RNTI associated with the PRACH occasion in which the Random Access Preamble is transmitted, is computed as:
        RA-RNTI = 1 + s_id + 14 × t_id + 14 × 80 × f_id + 14 × 80 × 8 × ul_carrier_id
        where s id is the index of the first OFDM symbol of the PRACH occasion (0 ≤ s_id < 14), t_id is the index of the first slot of the PRACH occasion in a system frame (0 ≤ t_id < 80), where the subcarrier spacing to determine t_id is based on the value of μ specified in TS 38.211, f_id is the index of the PRACH occasion in the frequency domain (0 ≤ f_id < 8), and ul_carrier_id is the UL carrier used for Random Access Preamble transmission (0 for NUL carrier, and 1 for SUL carrier).

MSGA Transmission

An example of UE behavior for MSGA transmission is in Table 11.

TABLE 11

The MAC entity shall, for each MSGA:
1> if PREAMBLE_TRANSMISSION_COUNTER is greater than one; and
1> if the notification of suspending power ramping counter has not been received from lower layers; and
1> if LBT failure indication was not received from lower layers for the last MSGA Random Access Preamble transmission; and
1> if SSB selected is not changed from the selection in the last Random Access Preamble transmission:
  2> increment PREAMBLE_POWER_RAMPING_COUNTER by 1.

TABLE 11-continued

1> select the value of DELTA_PREAMBLE;
1> set PREAMBLE_RECEIVED_TARGET_POWER to preambleReceivedTargetPower +
     DELTA_PREAMBLE + (PREAMBLE_POWER_RAMPING_COUNTER − 1) ×
     PREAMBLE_POWER_RAMPING_STEP;
1> if this is the first MSGA transmission within this RA procedure:
     2> if the transmission is not being made for the CCCH logical channel:
          3> indicate to the Multiplexing and assembly entity to include a C-RNTI MAC CE in
             the subsequent uplink transmission.
     2> obtain the MAC PDU to transmit from the Multiplexing and assembly entity and
        store it in the MSGA buffer.
1> compute the MSGB-RNTI associated with the PRACH occasion in which the Random
   Access Preamble is transmitted;
1> instruct the physical layer to transmit the MSGA using the selected PRACH occasion
   and the associated PUSCH resource, using the corresponding RA-RNTI, MSGB-RNTI,
   PREAMBLE_INDEX, PREAMBLE_RECEIVED_TARGET_POWER;
1> if LBT failure indication is received from lower layers for the transmission of this
   MSGA Random Access Preamble:
     2> instruct the physical layer to cancel the transmission of the MSGA payload on the
        associated PUSCH resource;
2>        perform the Random Access Resource selection procedure for 2-step random
          access. The MSGA transmission includes the transmission of the PRACH
          Preamble as well as the contents of the MSGA buffer in the PUSCH resource
          corresponding to the selected PRACH occasion and PREAMBLE_INDEX (see TS
          38.213)
             The MSGB-RNTI associated with the PRACH occasion in which the Random
Access Preamble is transmitted, is computed as:
             MSGB-RNTI = 1 + s_id + 14 × t_id + 14 × 80 × f_id + 14 × 80 × 8 ×
                ul_carrier_id + 14 × 80 × 8 × 2
where s_id is the index of the first OFDM symbol of the PRACH occasion (0 ≤ s_id < 14),
t_id is the index of the first slot of the PRACH occasion in a system frame (0 ≤ t_id < 80),
where the subcarrier spacing to determine t_id is based on the value of μ specified in TS
38.211, f_id is the index of the PRACH occasion in the frequency domain (0 ≤ f_id < 8), and
ul_carrier_id is the UL carrier used for Random Access Preamble transmission (0 for NUL
carrier, and 1 for SUL carrier). The RA-RNTI is calculated.

RAR Reception

An example of UE behavior for RAR reception is in Table 12.

TABLE 12

Once the Random Access Preamble is transmitted and regardless of the possible occurrence of
a measurement gap, the MAC entity shall:
    1> if the contention-free Random Access Preamble for beam failure recovery request was
       transmitted by the MAC entity:
         2> start the ra-ResponseWindow configured in BeamFailureRecoveryConfig at the first
            PDCCH occasion as specified in TS 38.213 from the end of the Random Access
            Preamble transmission;
         2> monitor for a PDCCH transmission on the search space indicated by
            recoverySearchSpaceId of the SpCell identified by the C-RNTI while ra-
            ResponseWindow is running.
    1> else:
         2> start the ra-ResponseWindow configured in RACH-ConfigCommon at the first
            PDCCH occasion as specified in TS 38.213 from the end of the Random Access
            Preamble transmission;
         2> monitor the PDCCH of the SpCell for RAR(s) identified by the RA-RNTI while the
            ra-ResponseWindow is running.
    1> if notification of a reception of a PDCCH transmission on the search space indicated by
       recoverySearchSpaceId is received from lower layers on the Serving Cell where the
       preamble was transmitted; and
    1> if PDCCH transmission is addressed to the C-RNTI; and
    1> if the contention-free Random Access Preamble for beam failure recovery request was
       transmitted by the MAC entity:
         2> consider the RA procedure successfully completed.
    1> else if a downlink assignment has been received on the PDCCH for the RA-RNTI and
       the received TB is successfully decoded:
         2> if the RAR contains a MAC subPDU with Backoff Indicator:
             3> set the PREAMBLE_BACKOFF to value of the BI field of the MAC subPDU
                using Table 7.2-1, multiplied with SCALING_FACTOR_BI.
         2> else:
             3> set the PREAMBLE_BACKOFF to 0 ms.
         2> if the RAR contains a MAC subPDU with Random Access Preamble identifier
            corresponding to the transmitted PREAMBLE_INDEX:
             3> consider this RAR reception successful.

TABLE 12-continued

```
        2> if the RAR reception is considered successful:
                3> if the RAR includes a MAC subPDU with RAPID only:
                        4> consider this RA procedure successfully completed;
                        4> indicate the reception of an acknowledgement for SI request to upper layers.
                3> else:
                        4> apply the following actions for the Serving Cell where the Random Access
                                Preamble was transmitted:
                                5> process the received Timing Advance Command;
                                5> indicate the preambleReceivedTargetPower and the amount of power
                                        ramping applied to the latest Random Access Preamble transmission to
                                        lower layers (e.g., (PREAMBLE_POWER_RAMPING_COUNTER – 1) ×
                                        PREAMBLE_POWER_RAMPING_STEP);
                                5> if the Serving Cell for the RA procedure is SRS-only SCell:
                                        6> ignore the received UL grant.
                                5> else:
                                        6> process the received UL grant value and indicate it to the lower layers.
                        4> if the Random Access Preamble was not selected by the MAC entity among the
                                contention-based Random Access Preamble(s):
                                5> consider the RA procedure successfully completed.
                        4> else:
                                5> set the TEMPORARY_C-RNTI to the value received in the RAR;
                                5> if this is the first successfully received RAR within this RA procedure:
                                        6> if the transmission is not being made for the CCCH logical channel:
                                                7> indicate to the Multiplexing and assembly entity to include a C-RNTI
                                                        MAC CE in the subsequent uplink transmission.
                                        6> obtain the MAC PDU to transmit from the Multiplexing and assembly
                                                entity and store it in the MSG3 buffer.
If within an RA procedure, an uplink grant provided in the RAR for the same group of
                contention-based Random Access Preambles has a different size than the first
                uplink grant allocated during that RA procedure, the UE behavior is not defined.
1> if ra-ResponseWindow configured in BeamFailureRecoveryConfig expires and if a
        PDCCH transmission on the search space indicated by recoverySearchSpaceId
        addressed to the C-RNTI has not been received on the Serving Cell where the preamble
        was transmitted; or
1> if ra-ResponseWindow configured in RACH-ConfigCommon expires, and if the RAR
        containing Random Access Preamble identifiers that matches the transmitted
        PREAMBLE_INDEX has not been received:
        2> consider the RAR reception not successful;
        2> increment PREAMBLE_TRANSMISSION_COUNTER by 1;
        2> if PREAMBLE_TRANSMISSION_COUNTER = preambleTransMax + 1:
                3> if the Random Access Preamble is transmitted on the SpCell:
                        4> indicate a Random Access problem to upper layers;
                        4> if this RA procedure was triggered for SI request:
                                5> consider the RA procedure unsuccessfully completed.
                3> else if the Random Access Preamble is transmitted on a SCell:
                        4> consider the RA procedure unsuccessfully completed.
        2> if the RA procedure is not completed:
                3> select a random back-off time according to a uniform distribution between 0 and
                        the PREAMBLE_BACKOFF;
                3> if the criteria to select contention-free Random Access Resources is met during the
                        back-off time:
                        4> perform the Random Access Resource selection procedure;
                3> else:
                        4> perform the Random Access Resource selection procedure after the back-off
                                time.
                                The MAC entity may stop ra-ResponseWindow (and hence monitoring for
RAR(s)) after successful reception of an RAR containing Random Access Preamble identifiers
that matches the transmitted PREAMBLE_INDEX.
HARQ operation is not applicable to the RAR reception.
```

MSGB Reception and Contention Resolution for 2-Step Random Access

An example of UE behavior for MSGB reception and contention resolution for 2-step random access is in Table 13.

TABLE 13

```
Once the MSGA is transmitted, regardless of the possible occurrence of a measurement gap,
the MAC entity shall:
        1> start the msgB-ResponseWindow at the first PDCCH occasion from the end of the
                MSGA transmission as specified in TS 38.213;
        1> monitor the PDCCH of the SpCell for an RAR identified by MSGB-RNTI while the
                msgB-ResponseWindow is running;
        1> if C-RNTI MAC CE was included in the MSGA:
                2> monitor the PDCCH of the SpCell for RAR identified by the C-RNTI while the
                        msgB-ResponseWindow is running;
```

TABLE 13-continued

1> if notification of a reception of a PDCCH transmission of the SpCell is received from lower layers:
  2> if the C-RNTI MAC CE was included in MSGA:
    3> if the RA procedure was initiated for beam failure recovery and the PDCCH transmission is addressed to the C-RNTI:
      4> consider this RAR reception successful;
      4> stop the msgB-ResponseWindow;
      4> consider this RA procedure successfully completed.
    3> else if the timeAlignmentTimer associated with the PTAG is running:
      4> if the PDCCH transmission is addressed to the C-RNTI and contains a UL grant for a new transmission:
        5> consider this RAR reception successful;
        5> stop the msgB-ResponseWindow;
        5> consider this RA procedure successfully completed.
    3> else:
      4> if a downlink assignment has been received on the PDCCH for the C-RNTI and the received TB is successfully decoded:
        5> if the MAC PDU contains the Absolute Timing Advance Command MAC CE:
          6> consider this RAR reception successful;
          6> stop the msgB-Response Window;
          6> consider this RA procedure successfully completed.
  2> if a downlink assignment has been received on the PDCCH for the MSGB-RNTI and the received TB is successfully decoded:
    3> if the MSGB contains a MAC subPDU with Backoff Indicator:
      4> set the PREAMBLE_BACKOFF to value of the BI field of the MAC subPDU using Table 7.2-1.
    3> else:
      4> set the PREAMBLE_BACKOFF to 0 ms.
    3> if the MSGB contains a fallbackRAR MAC subPDU; and
    3> if the Random Access Preamble identifier in the MAC subPDU matches the transmitted PREAMBLE_INDEX:
      4> consider this RAR reception successful;
      4> apply the following actions for the SpCell:
        5> process the received Timing Advance Command;
        5> set the TEMPORARY_C-RNTI to the value received in the fallbackRAR;
        5> indicate the preambleReceivedTargetPower and the amount of power ramping applied to the latest Random Access Preamble transmission to lower layers (e.g., (PREAMBLE_POWER_RAMPING_COUNTER – 1) × PREAMBLE_POWER_RAMPING_STEP);
        5> if the MSG3 buffer is empty:
          6> obtain the MAC PDU to transmit from the MSGA buffer and store it in the MSG3 buffer;
        5> process the received UL grant value and indicate it to the lower layers and proceed with MSG3 transmission;
If within an RA procedure with 2-step RA type, an uplink grant provided in the fallback RAR has a different size than the MSGA payload, the UE behavior is not defined.
    3> else if the MSGB contains a successRAR MAC subPDU; and
    3> if the CCCH SDU was included in the MSGA and the UE Contention Resolution Identity in the MAC subPDU matches the CCCH SDU:
      4> if this RA procedure was initiated for SI request:
        5> indicate the reception of an acknowledgement for SI request to upper layers.
      4> else:
        5> set the C-RNTI to the value received in the successRAR;
        5> apply the following actions for the SpCell:
          6> process the received Timing Advance Command;
          6> indicate the preambleReceivedTargetPower and the amount of power ramping applied to the latest Random Access Preamble transmission to lower layers (e.g., (PREAMBLE_POWER_RAMPING_COUNTER – 1) × PREAMBLE_POWER_RAMPING_STEP);
      4> deliver the TPC, PUCCH resource Indicator and HARQ feedback Timing Indicator received in successRAR to lower layers and instruct the lower layers to generate HARQ feedback for the successRAR, as specified in 38.213.
      4> consider this RAR reception successful;
      4> consider this RA procedure successfully completed;
      4> finish the disassembly and demultiplexing of the MAC PDU.
1> if msgB -ResponseWindow expires, and the RAR Reception has not been considered as successful based on descriptions above:
  2> income PREAMBLE_TRANSMISSION_COUNTER by 1;
  2> if PREAMBLE_TRANSMISSION_COUNTER = preambleTransMax + 1:
    3> indicate a Random Access problem to upper layers;
    3> if this RA procedure was triggered for SI request:
      4> consider this RA procedure unsuccessfully completed.
  2> if the RA procedure is not completed:
    3> select a random back-off time according to a uniform distribution between 0 and the PREAMBLE_BACKOFF;

TABLE 13-continued

```
    3> if msgATransMax is configured, and
            PREAMBLE_TRANSMISSION_COUNTER = msgATransMax + 1:
        4> set the RA_TYPE to 4-stepRA;
        4> set POW_OFFSET_2STEP_RA to
            (PREAMBLE_TRANSMISSION_COUNTER − 1) × (msgApreamble-
            powerRampingStep − powerRampingStep);
        4> perform initialization of variables specific to random access type;
        4> if the MSG3 buffer is empty:
            5> obtain the MAC PDU to transmit from the MSGA buffer and store it in the
                MSG3 buffer;
        4> flush HARQ buffer used for the transmission of MAC PDU in the MSGA
            buffer;
        4> perform the Random Access Resource selection procedure.
    3> else:
        4> perform the Random Access Resource selection procedure for 2-step random
            access after the back-off time.
            Upon receiving a fallbackRAR, the MAC entity may stop msgB-
ResponseWindow once the RAR reception is considered as successful
```

Contention Resolution

An example of UE behavior for Contention Resolution is in Table 14.

TABLE 14

```
Once MSG3 is transmitted, the MAC entity shall:
1> start the ra-ContentionResolutionTimer and restart the
ra-ContentionResolutionTimer at
    each HARQ retransmission in the first symbol after the end of the
    MSG3 transmission;
1> monitor the PDCCH while the ra-ContentionResolutionTimer is running
regardless of
    the possible occurrence of a measurement gap;
1> if notification of a reception of a PDCCH transmission of the SpCell
is received from
    lower layers:
    2> if the C-RNTI MAC CE was included in MSG3:
        3> if the RA procedure was initiated for beam failure recovery and the PDCCH
transmission is addressed to the C-RNTI; or
        3> if the RA procedure was initiated by a PDCCH order and the
            PDCCH transmission
is addressed to the C-RNTI; or
        3> if the RA procedure was initiated by the MAC sublayer itself or by the RRC
sublayer and the PDCCH transmission is addressed to the C-RNTI and contains a
UL grant for a new transmission:
4> consider this Contention Resolution successful;
4> stop ra-ContentionResolutionTimer;
4> discard the TEMPORARY_C-RNTI;
4> consider this RA procedure successfully completed.
    2> else if the CCCH SDU was included in MSG3 and the PDCCH transmission is
            addressed to its TEMPORARY_C-RNTI:
        3> if the MAC PDU is successfully decoded:
4> stop ra-ContentionResolutionTimer;
4> if the MAC PDU contains a UE Contention Resolution Identity MAC CE; and
4> if the UE Contention Resolution Identity in the MAC CE matches the CCCH
    SDU transmitted in MSG3:
    5> consider this Contention Resolution successful and finish the disassembly
        and demultiplexing of the MAC PDU;
    5> if this RA procedure was initiated for SI request:
        6> indicate the reception of an acknowledgement for SI request to upper
            layers.
    5> else:
        6> set the C-RNTI to the value of theTEMPORARY_C-RNTI;
    5> discard the TEMPORARY_C-RNTI;
    5> consider this RA procedure successfully completed.
4> else:
    5> discard the TEMPORARY_C-RNTI;
    5> consider this Contention Resolution not successful and discard the
        successfully decoded MAC PDU.
1> if ra-ContentionResolutionTimer expires:
    2> discard the TEMPORARY_C-RNTI;
    2> consider the Contention Resolution not successful.
1> if the Contention Resolution is considered not successful:
    2> flush the HARQ buffer used for transmission of the MAC PDU in
    the MSG3 buffer;
    2> increment PREAMBLE_TRANSMISSION_COUNTER by 1;
    2> if PREAMBLE_TRANSMISSION_COUNTER = preambleTransMax + 1:
```

TABLE 14-continued

```
    3> indicate a Random Access problem to upper layers.
    3> if this RA procedure was triggered for SI request:
4> consider the RA procedure unsuccessfully completed.
    2> if the RA procedure is not completed:
        3> select a random back-off time according to a uniform distribution between
            0 and
the PREAMBLE_BACKOFF;
        3> if the criteria to select contention-free Random Access Resources is
            met during the
back-off time:
4> perform the Random Access Resource selection procedure;
        3> else if the RA_TYPE is set to 2-stepRA:
4> if msgATransMax is configured and
    PREAMBLE_TRANSMISSION_COUNTER = msgATransMax + 1:
    5> set the RA_TYPE to 4-stepRA;
    5> set POW_OFFSET_2STEP_RA to
        (PREAMBLE_TRANSMISSION_COUNTER − 1) × (msgApreamble-
        powerRampingStep − powerRampingStep);
    5> perform initialization of variables specific to random access type;
    5> flush HARQ buffer used for the transmission of MAC PDU in the MSGA
        buffer; 5> perform the Random Access Resource selection.
4> else:
    5> perform the Random Access Resource selection for RA procedure with 2-
        step RA type after the back-off time.
3> else:
4> perform the Random Access Resource selection after the back-off time.
        (a) Completion of the RA procedure
    Upon completion of the RA procedure, the MAC entity shall:
1> discard explicitly-signalled contention-free Random Access Resources except
    contention-free Random Access Resources for beam failure recovery request, if any;
1> flush the HARQ buffer used for transmission of the MAC PDU in the MSG3
buffer and
    the MSGA buffer.
```

Figure 15:
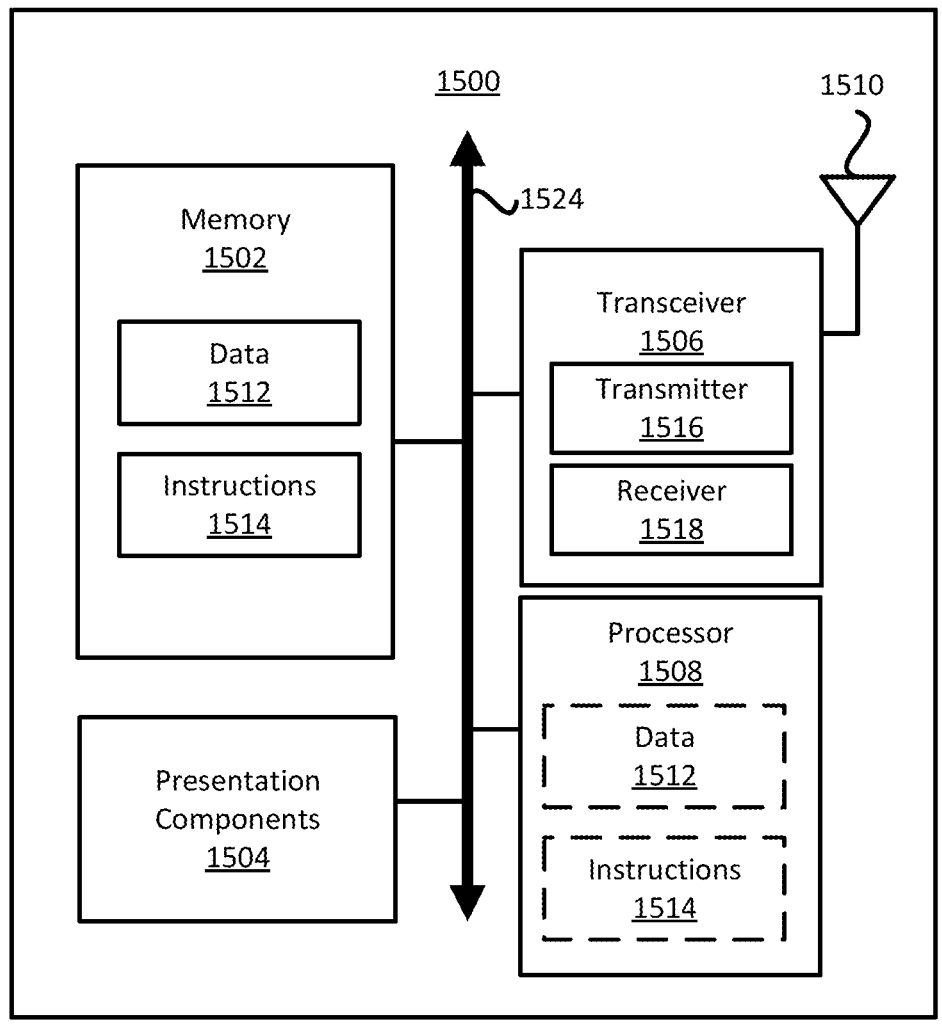
FIG. 15 illustrates a diagram of a node for wireless communication, in accordance with various implementations of the present disclosure.

FIG. 15 illustrates a block diagram of a node 1500 for wireless communication according to an implementation of the present disclosure. As illustrated in FIG. 15, the node 1500 may include a transceiver 1506, a processor 1508, a memory 1502, one or more presentation components 1504, and at least one antenna 1510. The node 1500 may also include an RF spectrum band module, a BS communications module, a network communications module, and a system communications management module, Input/Output (I/O) ports, I/O components, and a power supply (not explicitly illustrated in FIG. 15).

Each of these components may be in communication with each other, directly or indirectly, over one or more buses 1524. The node 1500 may be a UE or a BS that performs various functions described herein, for example, with reference to FIGS. 1 through 14.

The transceiver 1506 having a transmitter 1516 (e.g., transmitting/transmission circuitry) and a receiver 1518 (e.g., receiving/reception circuitry) may be configured to transmit and/or receive time and/or frequency resource partitioning information. The transceiver 1506 may be configured to transmit in different types of subframes and slots, including, but not limited to, usable, non-usable and flexibly usable subframes and slot formats. The transceiver 1506 may be configured to receive data and control channels.

The node 1500 may include a variety of computer-readable media. Computer-readable media can be any available media that can be accessed by the node 1500 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the previously disclosed communication media should also be included within the scope of computer-readable media.

The memory 1502 may include computer storage media in the form of volatile and/or non-volatile memory. The memory 1502 may be removable, non-removable, or a combination thereof. For example, the memory 1502 may include solid-state memory, hard drives, optical-disc drives, etc. As illustrated in FIG. 15, the memory 1502 may store computer-readable and/or computer-executable instructions 1514 (e.g., software code(s) or computer-executable program(s)) that are configured to, when executed, cause the processor 1508 to perform various functions described herein, for example, with reference to FIGS. 1 through 14. Alternatively, the instructions 1514 may not be directly executable by the processor 1508 but may be configured to cause the node 1500 (e.g., when compiled and executed) to perform various functions described herein.

The processor 1508 (e.g., having processing circuitry) may include an intelligent hardware device, a Central Processing Unit (CPU), a microcontroller, an ASIC, etc. The processor 1508 may include memory. The processor 1508 may process the data 1512 and the instructions 1514 received from the memory 1502, and information through the transceiver 1506, the baseband communications module, and/or the network communications module. The processor 1508 may also process information to be sent to the transceiver 1506 for transmission through the antenna 1510, to the network communications module for transmission to a CN.

One or more presentation components 1504 may present data indications to a person or other devices. Examples of presentation components 1504 may include a display device, speaker, printing component, vibrating component, etc.

From the present disclosure, it is manifested that various techniques may be used for implementing the concepts described in the present application without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A wireless communication method performed by a User Equipment (UE), the wireless communication method comprising:
   receiving, from a Base Station (BS), a Radio Resource Control (RRC) reconfiguration message including information related to a reconfiguration with synchronization, the information including a Contention Free Random Access (CFRA) configuration for a 2-step Random Access (RA), the CFRA configuration configuring a resource and a maximum number of Message-A (MSGA) preamble transmissions;
   starting a timer upon receiving the RRC reconfiguration message including the information related to the reconfiguration with synchronization, the timer being configured by the information;
   initiating an RA procedure after starting the timer, with an RA type set to a 2-step RA type, for the reconfiguration with synchronization, the RA procedure comprising transmitting an MSGA preamble;
   discarding the resource in a case that a value of a preamble transmission counter reaches the maximum number of MSGA preamble transmissions;
   discarding the resource in a case that the timer expires; and
   discarding the resource in a case that the UE sets the RA type from the 2-step RA type to a 4-step RA type for the RA procedure.

2. The wireless communication method of claim 1, wherein the resource includes at least one of a Physical Uplink Shared Channel (PUSCH) resource and a CFRA resource for the 2-step RA.

3. The wireless communication method of claim 1, wherein the resource is a dedicated resource for the UE.

4. The wireless communication method of claim 1, further comprising:
   stopping the timer upon successful completion of the RA procedure; and
   discarding the resource further in a case of the successful completion of the RA procedure.

5. The wireless communication method of claim 1, further comprising:
   stopping the RA procedure in a case that the UE resets a Medium Access Control (MAC) entity of the UE; and
   discarding the resource further in a case that the RA procedure is stopped.

6. The wireless communication method of claim 1, further comprising resetting the value of the preamble transmission counter when the RA procedure is initiated.

7. The wireless communication method of claim 1, further comprising incrementing the value of the preamble transmission counter when a time window expires, wherein the time window is a time period for the UE to monitor a Random Access Response (RAR) for the RA procedure with the 2-step RA type.

8. The wireless communication method of claim 1, wherein the maximum number of MSGA preamble transmissions is indicated by an Information Element (IE) denoted as msgA-TransMax in the CFRA configuration for the 2-step RA.

9. A User Equipment (UE) comprising:
   at least one processor; and
   at least one memory coupled to the at least one processor, wherein the at least one memory stores computer-executable instructions that, when executed by the at least one processor, cause the UE to:
   receive, from a Base Station (BS), a Radio Resource Control (RRC) reconfiguration message including information related to a reconfiguration with synchronization, the information including a Contention Free Random Access (CFRA) configuration for a 2-step Random Access (RA), the CFRA configuration configuring a resource and a maximum number of Message-A (MSGA) preamble transmissions;
   start a timer upon receiving the RRC reconfiguration message including the information related to the reconfiguration with synchronization, the timer being configured by the information;
   initiate an RA procedure after starting the timer, with an RA type set to a 2-step RA type, for the reconfiguration with synchronization, the RA procedure comprising transmitting an MSGA preamble;
   discard the resource in a case that a value of a preamble transmission counter reaches the maximum number of MSGA preamble transmissions;
   discard the resource in a case that the timer expires; and
   discard the resource in a case that the UE sets the RA type from the 2-step RA type to a 4-step RA type for the RA procedure.

10. The UE of claim 9, wherein the resource includes at least one of a Physical Uplink Shared Channel (PUSCH) resource and a CFRA resource for the 2-step RA.

11. The UE of claim 9, wherein the resource is a dedicated resource for the UE.

12. The UE of claim 9, wherein the computer-executable instructions, when executed by the at least one processor, further cause the UE to:
   stop the timer upon successful completion of the RA procedure; and
   discard the resource further in a case of the successful completion of the RA procedure.

13. The UE of claim 9, wherein the computer-executable instructions, when executed by the at least one processor, further cause the UE to:
- stop the RA procedure in a case that the UE resets a Medium Access Control (MAC) entity of the UE; and
- discard the resource further in a case that the RA procedure is stopped.

14. The UE of claim 9, wherein the computer-executable instructions, when executed by the at least one processor, further cause the UE to:
- reset the value of the preamble transmission counter when the RA procedure is initiated.

15. The UE of claim 9, wherein the computer-executable instructions, when executed by the at least one processor, further cause the UE to:
- increment the value of the preamble transmission counter when a time window expires, wherein the time window is a time period for the UE to monitor a Random Access Response (RAR) for the RA procedure with the 2-step RA type.

16. The UE of claim 9, wherein the maximum number of MSGA preamble transmissions is indicated by an Information Element (IE) denoted as msgA-TransMax in the CFRA configuration for the 2-step RA.

* * * * *